(12) United States Patent
Kido

(10) Patent No.: US 11,743,053 B2
(45) Date of Patent: Aug. 29, 2023

(54) ELECTRONIC SIGNATURE SYSTEM AND TAMPER-RESISTANT DEVICE

(71) Applicant: Keisuke Kido, Yokohama (JP)

(72) Inventor: Keisuke Kido, Yokohama (JP)

(*) Notice: Subject to any disclaimer, the term of this patent is extended or adjusted under 35 U.S.C. 154(b) by 0 days.

(21) Appl. No.: 17/778,546

(22) PCT Filed: Nov. 10, 2020

(86) PCT No.: PCT/JP2020/041970
§ 371 (c)(1),
(2) Date: May 20, 2022

(87) PCT Pub. No.: WO2021/111824
PCT Pub. Date: Jun. 10, 2021

(65) Prior Publication Data
US 2023/0038949 A1    Feb. 9, 2023

(30) Foreign Application Priority Data

Dec. 3, 2019  (JP) ................................. 2019-218478
Sep. 8, 2020  (JP) ................................. 2020-150907

(51) Int. Cl.
*H04L 9/40*    (2022.01)
*H04L 9/32*    (2006.01)
(Continued)

(52) U.S. Cl.
CPC ............ *H04L 9/3247* (2013.01); *G06F 21/86* (2013.01); *H04L 9/3073* (2013.01); *H04L 9/3213* (2013.01); *H04L 9/3268* (2013.01)

(58) Field of Classification Search
CPC ... H04L 9/3247; H04L 9/3073; H04L 9/3213; H04L 9/3268; G06F 21/86
See application file for complete search history.

(56) References Cited

U.S. PATENT DOCUMENTS 6,460,138 B1 * 10/2002 Morris .................. H04L 9/3226
                                                    713/168
7,577,852 B2 * 8/2009 Okazaki ................ H04L 9/3247
                                                    713/189
(Continued)

FOREIGN PATENT DOCUMENTS

JP      2005-20536 A      1/2005
JP      2007-306365 A    11/2007
(Continued)

OTHER PUBLICATIONS

Hirohisa Ogawa, "Consideraion of Situation Remote Signature", Network Security Forum 2017, Jan. 23, 2017, total 42 pages.
(Continued)

*Primary Examiner* — Ghodrat Jamshidi
(74) *Attorney, Agent, or Firm* — Birch, Stewart, Kolasch & Birch, LLP

(57) ABSTRACT

The present invention realizes an electronic signature system with high security level in which abuse of a signature key by a system administrator is prevented. A user sets an authentication information conceived by the user himself to his/her own signature key stored in the tamper resistant device (5) via the terminal device (2). When digitally signing an electronic document, the user transmits his/her own encrypted authentication information to the tamper resistant device (5) through the terminal device (2) and asks for permission to use his/her signature key. The tamper resistant device (5) decodes the inputted authentication information, verifies the decoded authentication information, and allows the digital signing only if the correct authentication information is entered. As a result, the electronic signature system in which only a user having valid use authority for the signature key can digitally sign is built.

20 Claims, 11 Drawing Sheets

(51) Int. Cl.
*G06F 21/86* (2013.01)
*H04L 9/30* (2006.01)

(56) References Cited

U.S. PATENT DOCUMENTS

| | | | | |
|---|---|---|---|---|
| 7,874,010 | B1* | 1/2011 | Perlman | H04L 9/088 |
| | | | | 713/168 |
| 9,674,158 | B2* | 6/2017 | Korondi | H04L 9/3213 |
| 2005/0114670 | A1 | 5/2005 | Bowe et al. | |
| 2007/0266234 | A1 | 11/2007 | Inami | |
| 2008/0301457 | A1* | 12/2008 | Uesugi | H04L 9/3263 |
| | | | | 713/178 |
| 2010/0040233 | A1* | 2/2010 | Ganapathy | H04L 63/123 |
| | | | | 380/277 |
| 2016/0080374 | A1* | 3/2016 | Kondoh | H04L 63/102 |
| | | | | 726/4 |
| 2016/0232521 | A1* | 8/2016 | Sharp | G06Q 20/3229 |
| 2016/0286391 | A1* | 9/2016 | Khan | G06Q 20/327 |
| 2016/0366128 | A1* | 12/2016 | Dascola | H04L 63/0861 |
| 2017/0141924 | A1* | 5/2017 | Ryu | H04L 9/3236 |
| 2018/0351739 | A1* | 12/2018 | Ota | H04L 9/3231 |
| 2019/0116044 | A1* | 4/2019 | Matsumoto | H04L 9/321 |
| 2019/0156020 | A1* | 5/2019 | Sato | H04L 9/0894 |
| 2021/0075606 | A1* | 3/2021 | Zeh | H04L 9/0897 |

FOREIGN PATENT DOCUMENTS

| | | |
|---|---|---|
| JP | 2018-106452 A | 7/2018 |
| JP | 6465426 B1 | 2/2019 |

OTHER PUBLICATIONS

International Search Report, issued in PCT/JP2020/041970, PCT/ISA/210, dated Feb. 2, 2021.
Written Opinion of the International Searching Authority, issued in PCT/JP2020/041970, PCT/ISA/237, dated Feb. 2, 2021.

* cited by examiner

[Fig. 1]
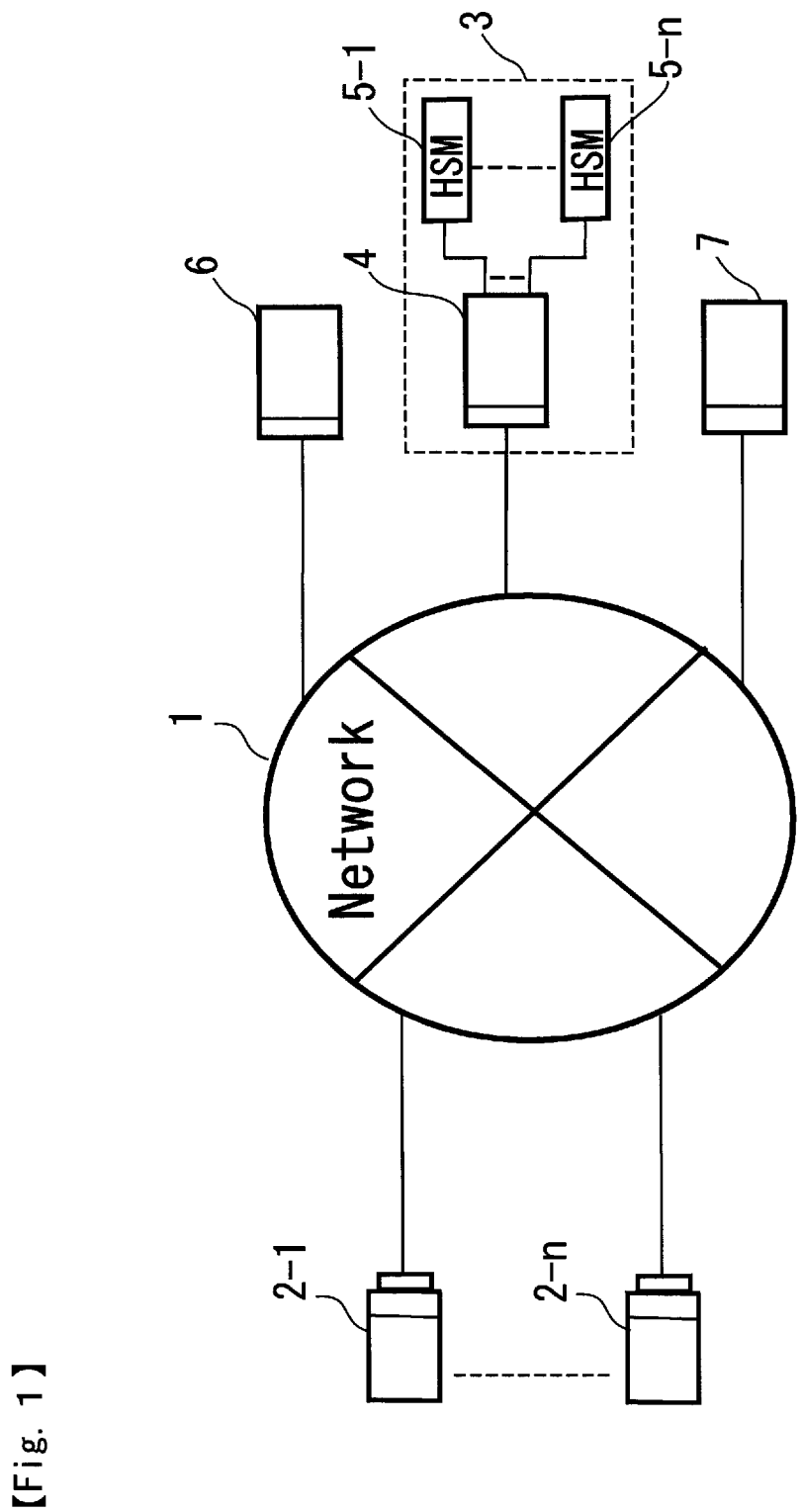

[Fig. 2]
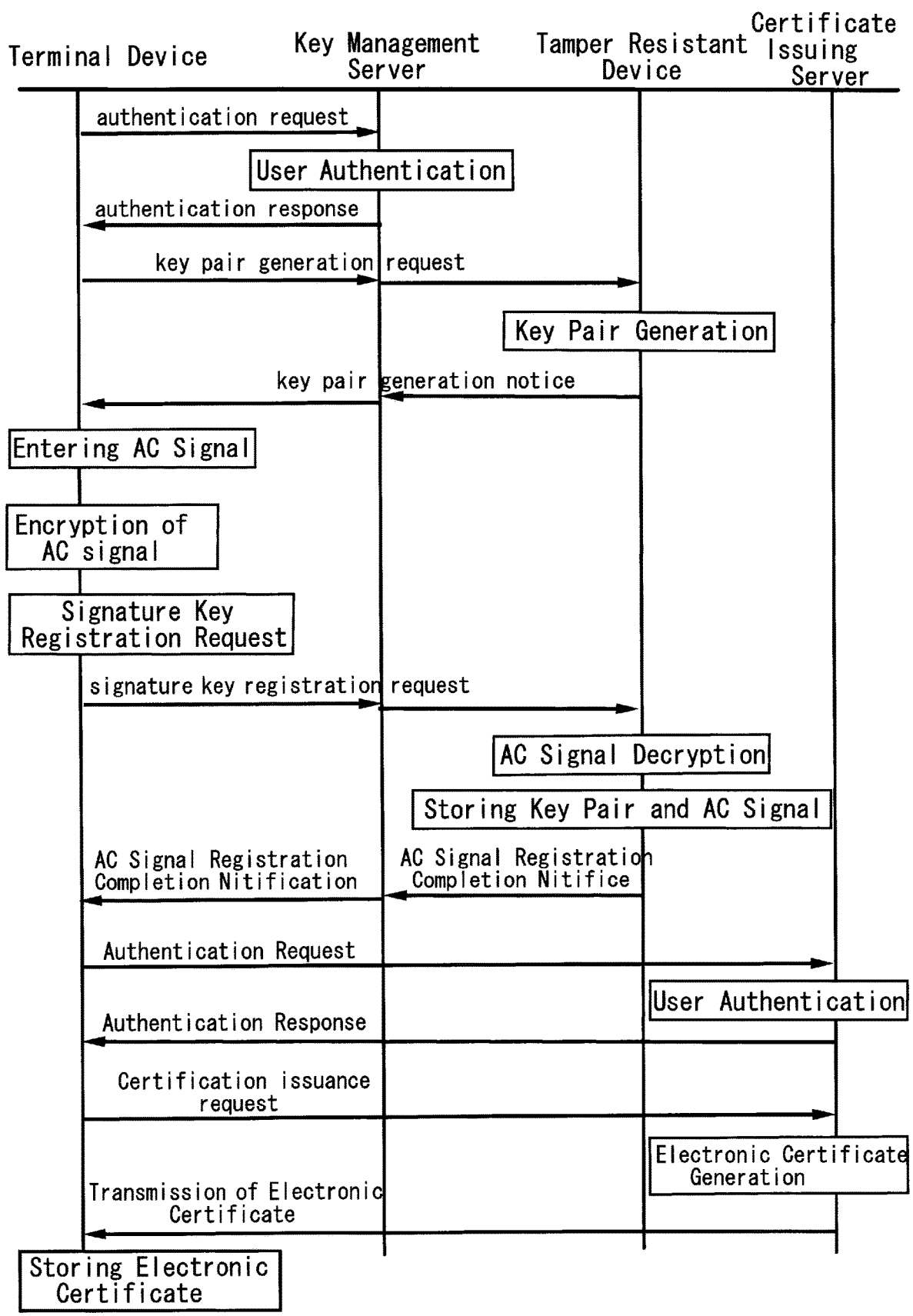

[Fig. 3]
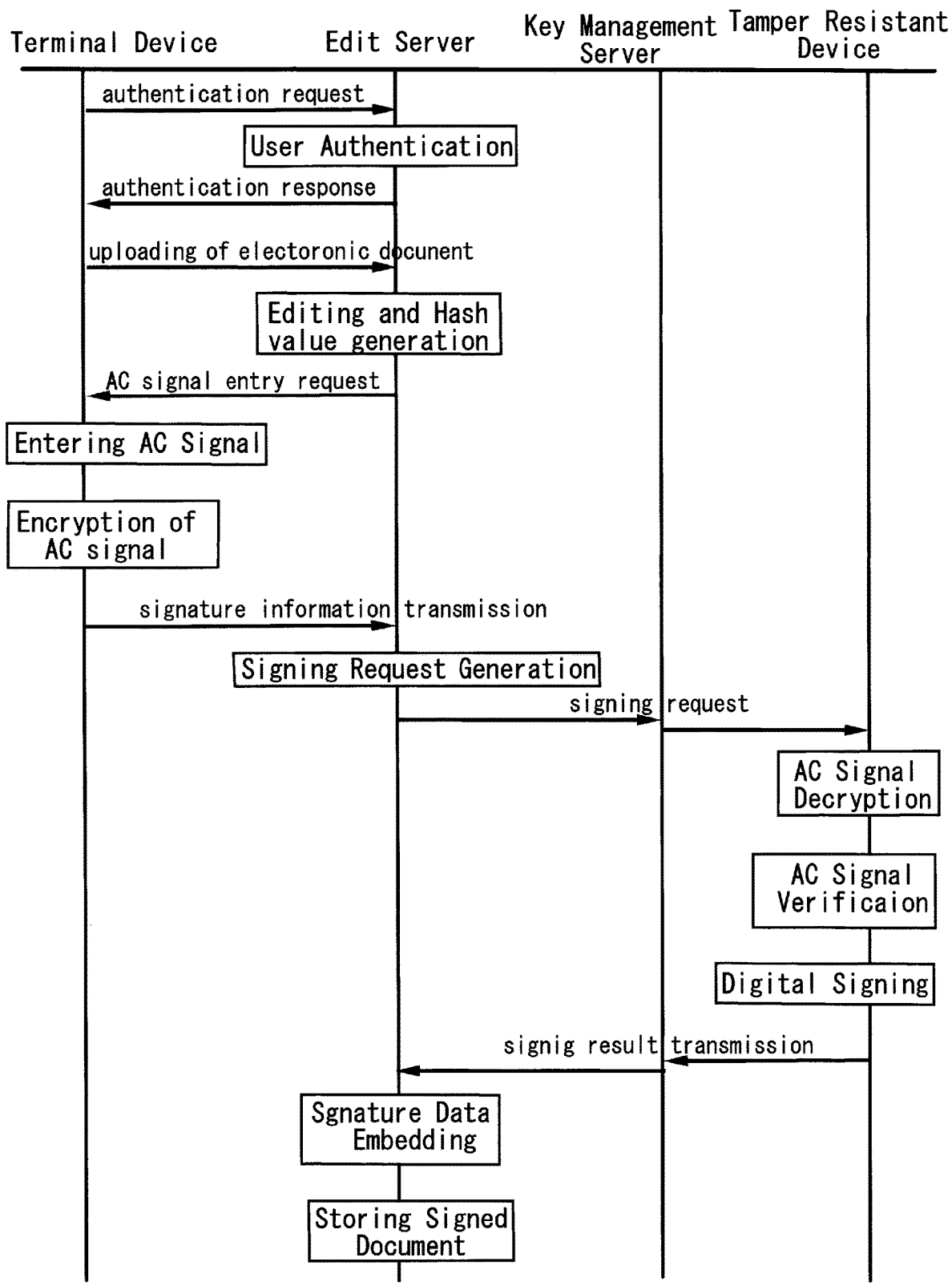

[Fig. 4]
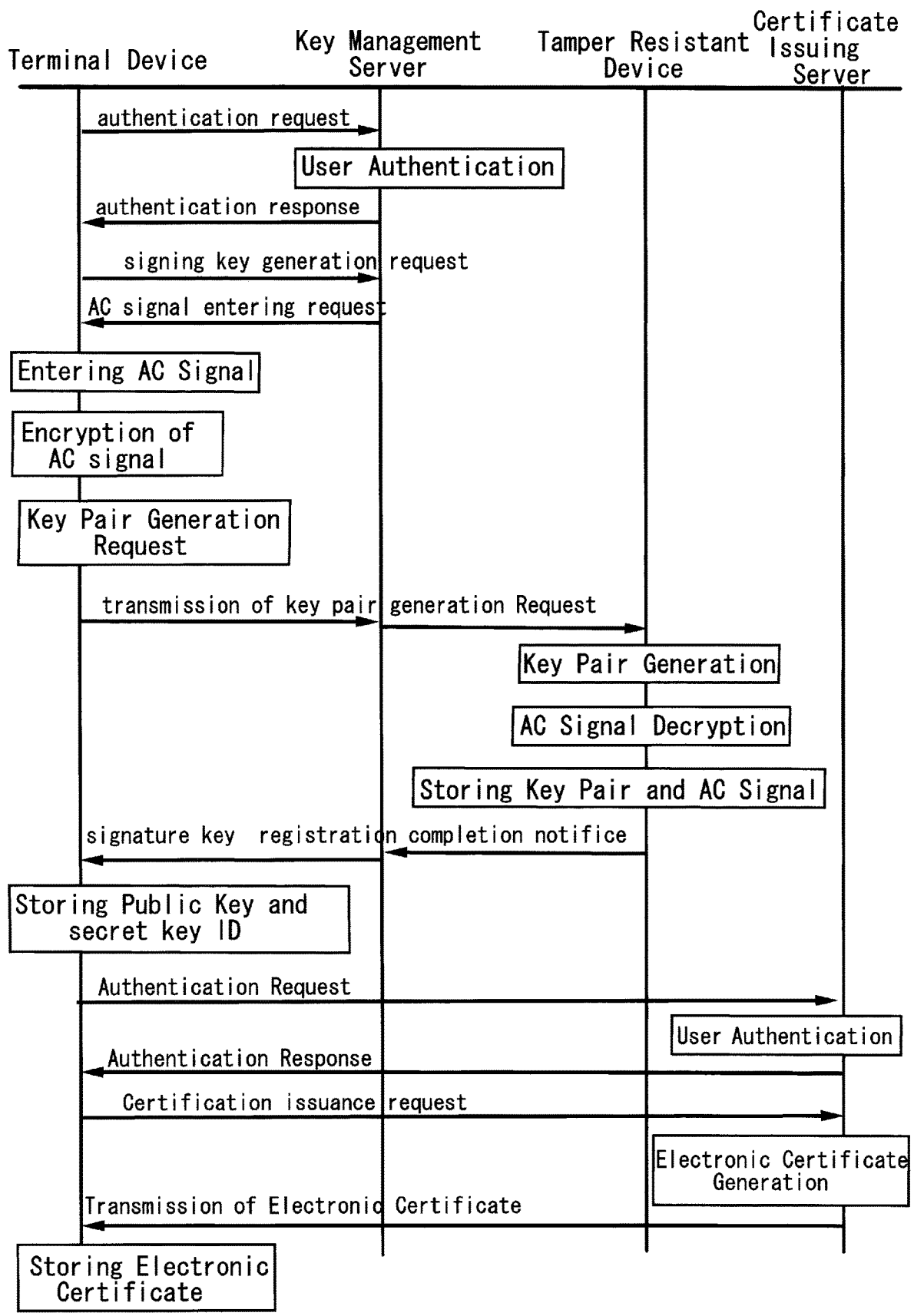

[Fig. 5]
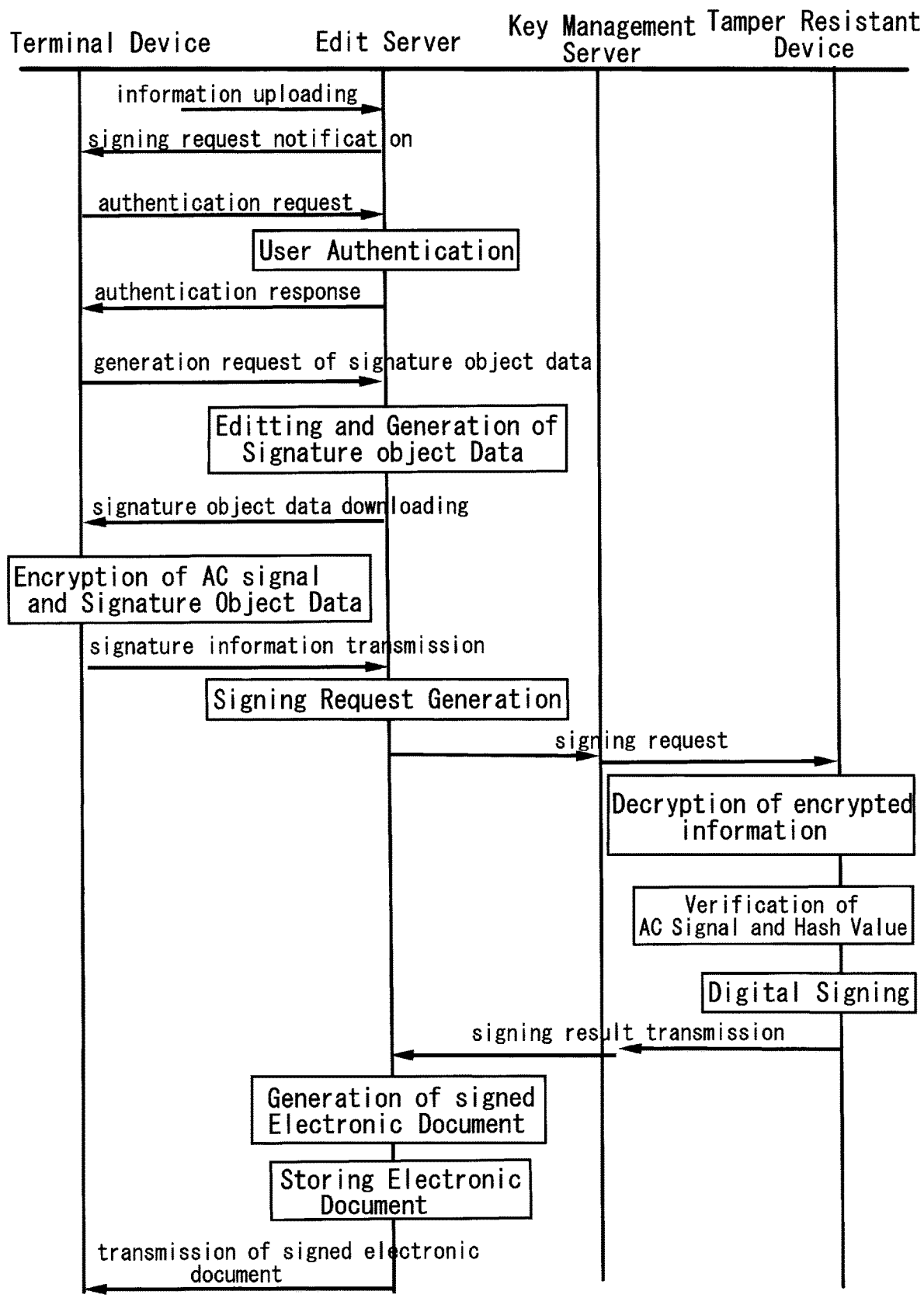

[Fig. 6]
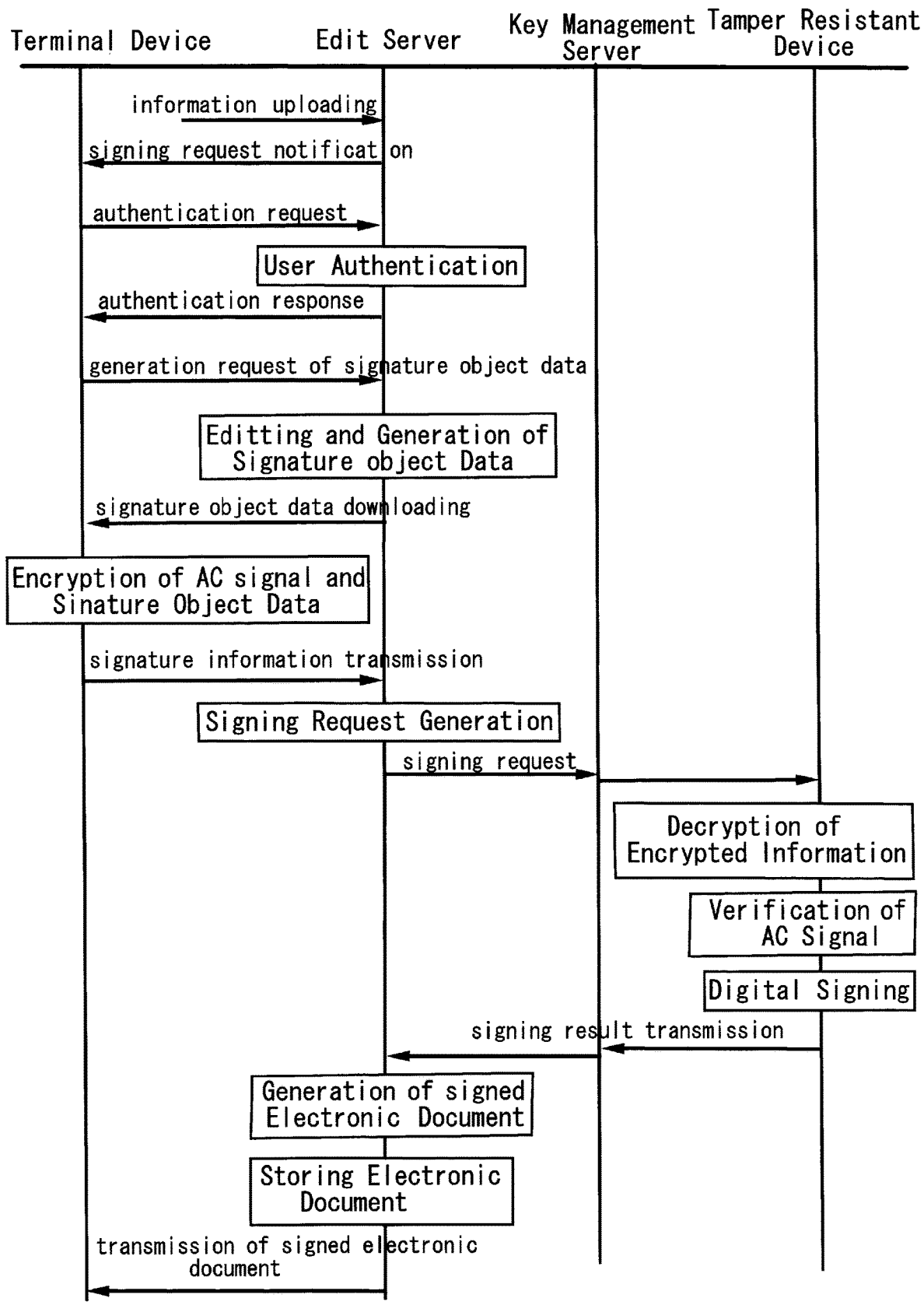

[Fig. 7]
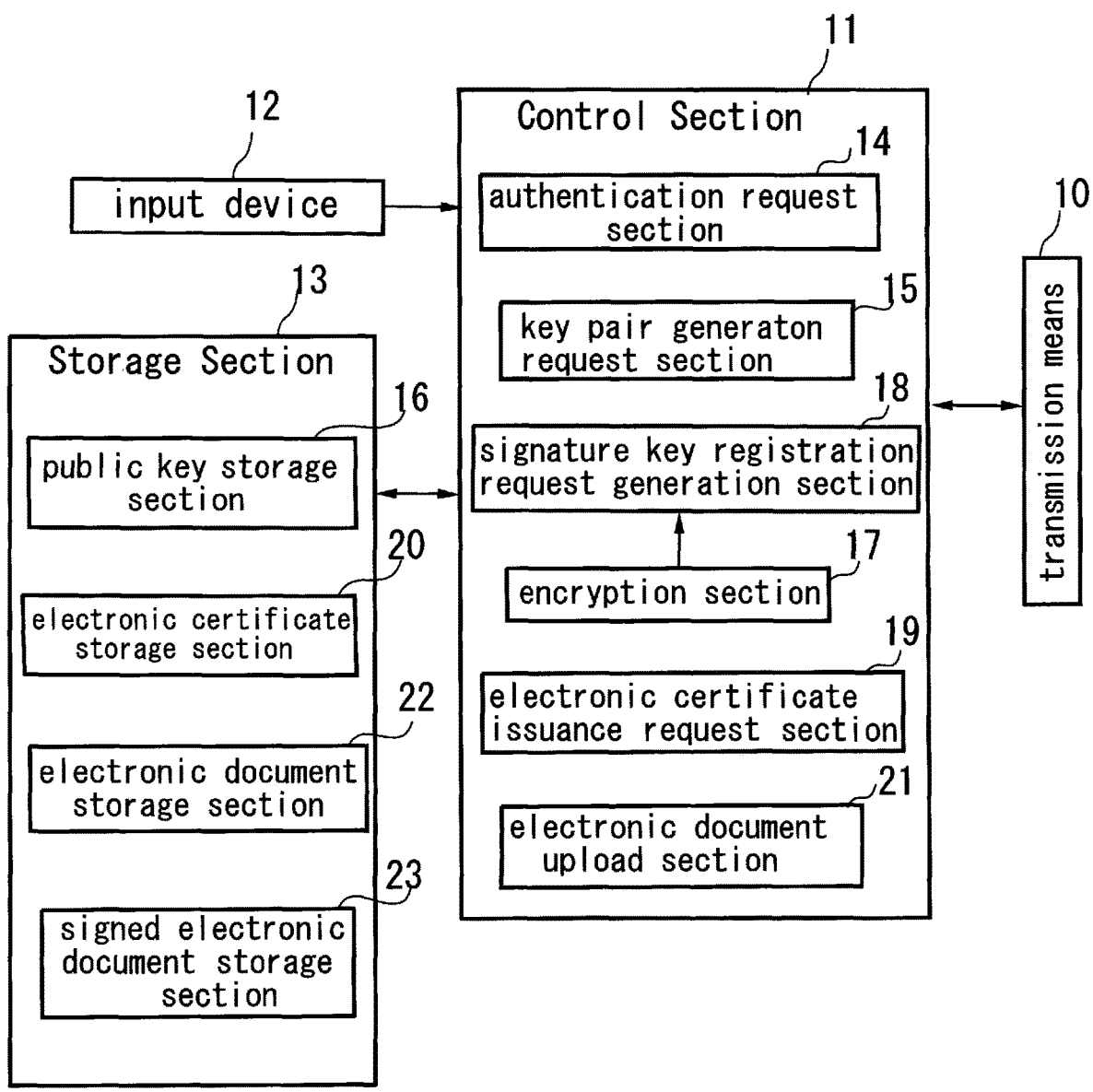

[Fig. 8]
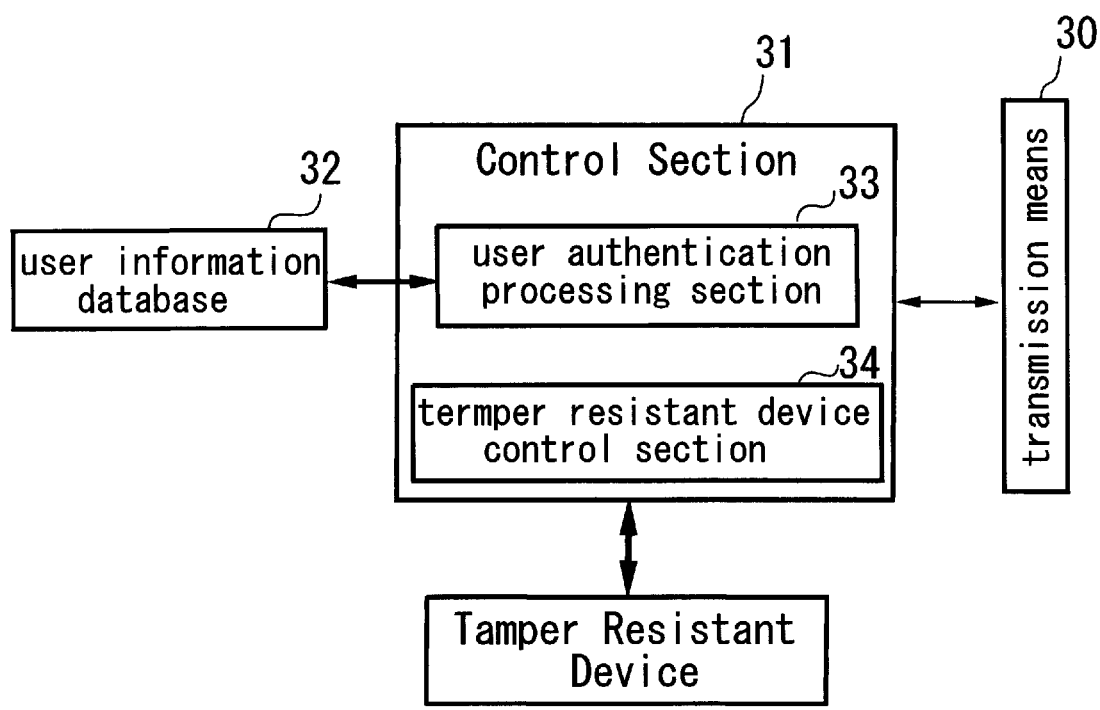

[Fig. 9]
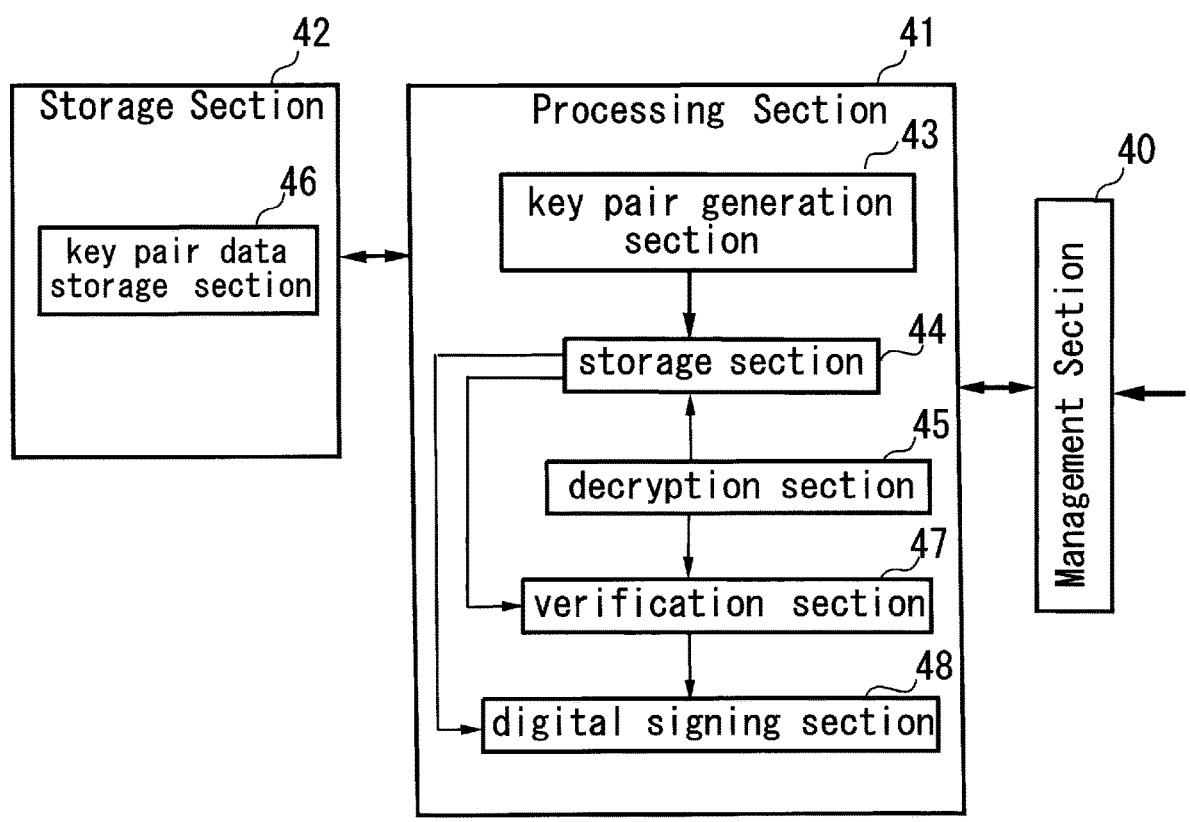

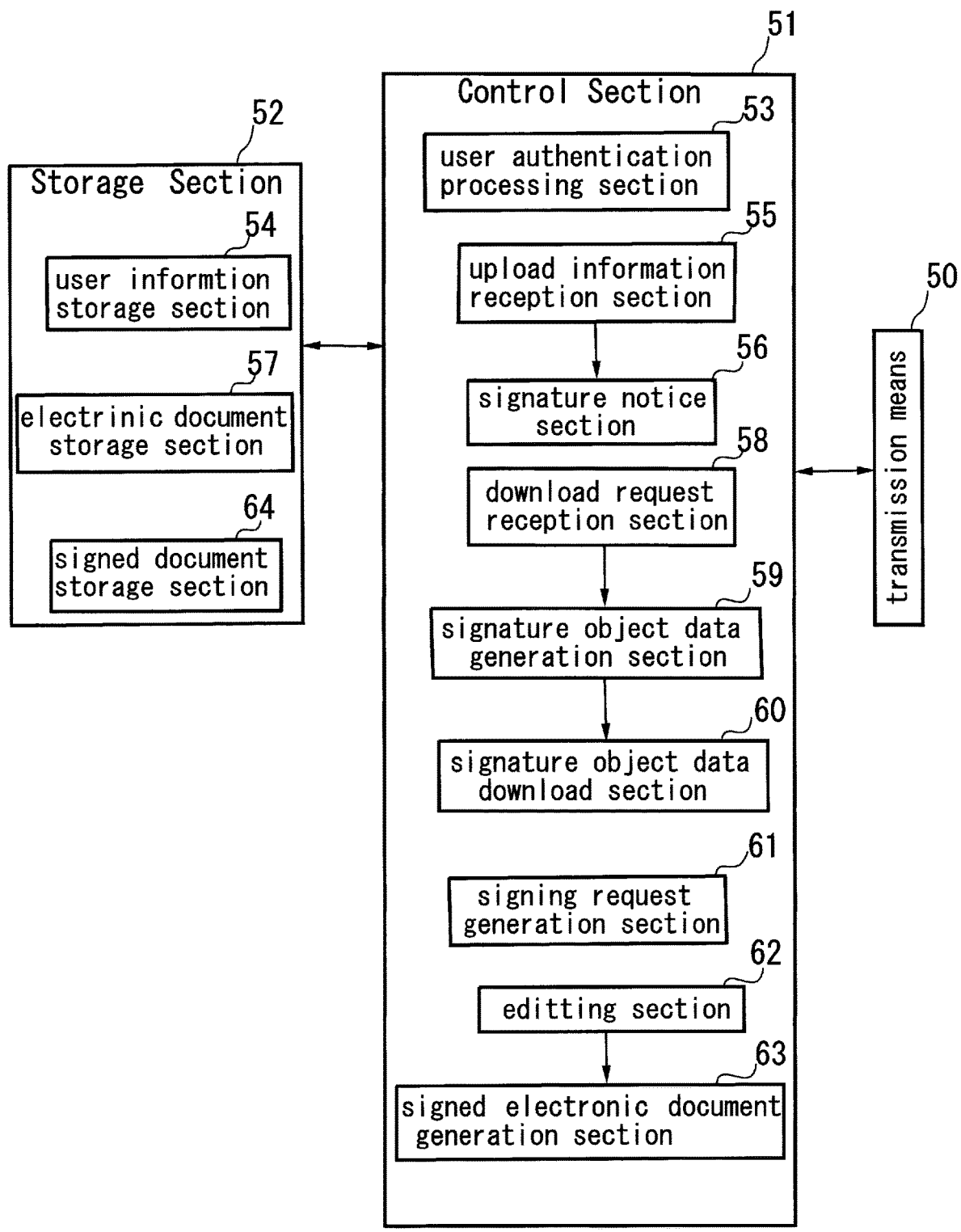

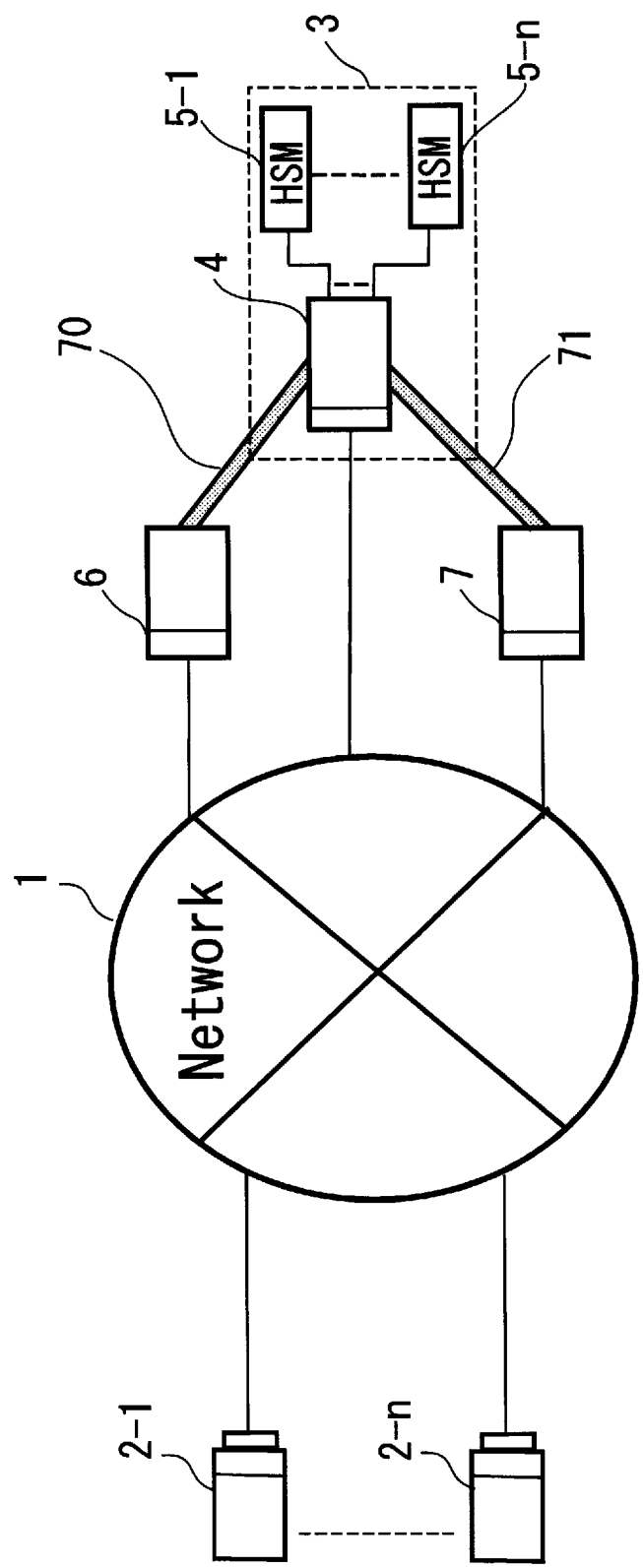
[Fig. 11]

ELECTRONIC SIGNATURE SYSTEM AND TAMPER-RESISTANT DEVICE

TECHNICAL FIELD

The present invention relates to an electronic signature system of a remote signing type.

Further, the present invention relates to a tamper resistant device which is used in the electronic signature system of a remote signing type.

BACKGROUND ART

A remote signing system in which a user's signature key is installed on an enterpriser's server, and the user logs in to the server remotely and electronically signs on the enterpriser's server using his/her own signature key has been proposed. According to the remote signing system, the digital signing can be performed remotely and the user does not need to manage his/her own signature key, and so this system is expected as a signature system with high convenience.

As the electronic signature system using a remote signing method, the electronic signature system comprising a key management system for controlling the signature key, a certificate issuing system for generating a digital certificate, and terminal devices through which users operate has been proposed (for example, see PLT 1). In this known electronic signature system, the user authentication is performed using a combination of a user ID and a password on the basis of a user's account set up on the key management system.

As another remote signing system, the following system configuration is disclosed in a non-patent literature 1. A signer transmits his own signer's ID and signature object data to a signature application to perform an authentication request. If the signer is authenticated as valid by the signature application, the signature key ID associated with the signer ID and the signature object data are sent from the signature application to a signature device. In the signature device, the signing processing is performed using the signature key specified by the signature key ID, and the signed signature object data are outputted.

Furthermore, in the above mentioned non-patent literature 1, there is also described a feature in which two elements authentication is performed in the remote signing system. In order to perform the two elements authentication, the information for activating the signature key is transmitted from the terminal device to the signature device.

PRIOR ART DOCUMENTS

Patent Document

PLT1: Japanese Patent Publication (B) No. 6465426

Non Patent Document

NPLT1: Review Status of Remote Signature (Network Security Forum 2017)

SUMMARY OF INVENTION

Technical Problem

In the electronic signature system currently in practical use, it is a fact that only the user authentication using the user's ID and the password is performed. However, with user authentication using the user ID and the password alone, there is a high risk of impersonation, and it is strongly demanded to increase the security level.

In the remote signing system, it is important that only the person himself/herself can sign. However, since the signature key is managed in the enterpriser's server and the electronic signing is performed on the enterpriser's server, there is a risk that the signature key could be abused by a malicious system administrator. That is, even though the electronic signing is performed in a tamper resistant device such as an HSM, various information is sent to the tamper resistant device through the key management server for controlling the tamper resistant device.

Accordingly, a system administrator can steal or extract the various information at the key management server. Therefore, there is a risk that various faults will be caused due to the fact that the signing request which includes the authentication information indicating the use authority for the signature key and the signature object data that is a target of the electronic signature passes through a key management server. Especially, there is a risk that the signature key or the information controlling the signature key will be stolen or abused by the system administrator.

An object of the present invention is to provide an electronic signature system in which only a person having the use authority for the signature key can electronically sign.

An object of the invention is to realize an electronic signature system in which the problems caused by which the signing request passes through the key management server are solved, and the abuse by the administrators is prevented.

Solution to Problem

The electronic signature system according to the invention comprising a signing system which includes one or more than one tamper resistant devices having a function for generating and managing signature keys and a key management server having a function for controlling the tamper resistant devices, and terminal devices through which users or signers operate, wherein said tamper resistant device comprises a function for generating a key pair of a public key and a secret key acting as a signature key, a function for storing the generated signature key together with authentication information indicating the use authority for the signature key, a decryption function for decrypting a crypto token including the encrypted authentication information or a crypto token including the encrypted authentication information and encrypted signature object data using a decryption key, a verification function for verifying the decrypted authentication information or verifying the decrypted authentication information and the decrypted signature object data, and a signing function for digitally signing using the signature key based on the verification result, and wherein said terminal device comprises a means for inputting the authentication information, and an encryption means for encrypting the authentication information or the authentication information and the signature object data to form the crypto token, using an encryption key, and wherein said tamper resistant device generates the key pair of the public key and the secret key in response to a key pair generation request or a signature key generation request from the terminal device, and the generated secret key is stored in the tamper resistant device in relation with the user's authentication information, and wherein when digitally signing, a signing request including at least the crypto token which is generated by the terminal device and the signature key identification information which specifies the signature key is entered into the tamper resistant device, and wherein said tamper resistant device decrypts the received crypto token using the decryption key, and verifies the consistency between the decrypted authentication information and the authentication information stored in relation with the signature key identified by the signature key identification information.

According to the invention, using the terminal device, the user sets the authentication information conceived by user himself to his own signature key stored in the tamper resistant device to store the signature key and the authentication information in relation with each other in the tamper resistant device. When electronically signing an electronic document, the signer transmits his own authentication information to the tamper resistant device through the terminal device to ask for permission to use the signature key. The tamper resistant device verifies the entered authentication information, and allows signing only when the inputted authentication information is right, and the digitally signing is performed. As the result of this, the electronic signature system in which only the user having the legitimate use authority for the signature key can digitally sign is built. Therefore, an electronic signature system having a higher security level than the conventional electronic signature system can be realized.

However, in the electronic signature system of this type, there is a risk that the signature key may be abused when the authentication information set by the user is stolen. For example, if the signature key ID and the authentication information are stolen and the signing request including the falsified signature object data (Hash value) is performed, since the tamper resistant device may judge that the entered authentication information is valid, the tamper resistant device decides that the inputted authentication information is valid and signs the falsified signature object data. Therefore, in order to effectively utilize this electronic signature system, it is more important to protect the authentication information indicating legitimate use authority.

According to the invention, in order to effectively protect the authentication information, the following solutions are employed. As the first measure, the authentication information sent from the terminal device to the tamper resistant device is encrypted by use of an encryption method that cannot be decoded by a third party. As the second measure, in addition to verifying the owner of the signature key, the signature object data to be signed is verified as well.

In the above mentioned electronic signature system of the invention, there is installed the first measure. According to the invention, the authentication information is transmitted from the terminal device to the tamper resistant device by way of the key management server. In this case, since the authentication information passes through the key management server, the authentication information has a risk that it could be stolen at the key management server by the system administrator. So, according to the invention, the secret key and public key of the key pair which is generated in order to create the signature key is used for the public key encrypted communication. That is, the secret key of the key pair generated in order to create the signature key is used as the decryption key and the public key is used as the encryption key so that the public key encrypted communication is performed. The authentication information which is encrypted using the public key of the key pair can only be decrypted using the corresponding secret key, and the secret key operating as the decryption key is safely stored within the tamper resistant device. Therefore, even if the signing request is stolen by the system administrator, the authentication information is never decoded. Besides, since the public key of the key pair is to be transmitted to the terminal device after it being generated by the tamper resistant device, the advantage of eliminating the complexity of address setting of the tamper resistant device at the terminal device is achieved.

In a preferable embodiment of the electronic signature system according to the invention, the tamper resistant device comprises the key pair of the secret key and public key set to perform the public key encryption communication, the encryption means of the terminal device encrypts using the public key of the key pair set to the tamper resistant device as the encryption key, and said tamper resistant device decrypts using the secret key of said key pair as the decryption key.

The secret key (decryption key) of the key pair for the public key encryption communication set to the tamper resistant device is safely stored within the tamper resistant device and never leaks outside. Therefore, if the public key set to the tamper resistant device is used as the encryption key to encrypt the authentication information and the encrypted authentication information is decrypted using the secret key as the decryption key, the high security level similar to that of the system in which the encryption is performed using the key pair created when generating the signature key is established.

In a preferable embodiment of the electronic signature system according to the invention, the crypto token included in the signing request includes the encrypted authentication information and the encrypted signature object data, and the tamper resistant device decrypts the encrypted authentication information and the encrypted signature object data, and digitally signs the decrypted signature object data based on the verification result for the authentication information. In the present embodiment, the crypto token includes two elements of the authentication information inputted by the user and the signature object data to be signed, and these two elements are encrypted. In this case, since both of the authentication information and the signature object data are encrypted, the signature object data is never falsified even if the signing request passes through the key management server.

In a preferable embodiment of the electronic signature system according to the invention, the signing request includes the crypto token including the encrypted authentication information and the encrypted signature object data, the signature key identification information, and the signature object data to be signed, said tamper resistant device decodes the crypto token, verifies the consistency of the authentication information and the consistency between the signature object data to be signed and the decoded signature object data, and digitally signs on the signature object data to be signed based on the verification result. In this embodiment, the terminal device encrypts the authentication information and the signature object data, and the tamper resistant device verifies both of these. Then, if the verification results for both the authentication information and the signature object data are not normal, this signing request is processed as an error. Therefore, the situation of digitally signing the falsified signature object data is avoided.

The electronic signature system according to the invention comprising a signing system which comprises one or more than one tamper resistant devices and a key management server having a function for controlling the tamper resistant device, an edit server having a function for managing an electronic document to be signed, and a certificate issuing server for generating a digital certificate used for the digital signing, and terminal devices through which users or signers operate, wherein said tamper resistant device comprises a function for generating a key pair of a public key and a secret key acting as a signature key, a function for storing the generated signature key in relation with authentication information indicating the use authority for the signature key, a function for decrypting a crypto token including the encrypted authentication information and the encrypted signature object data using a decryption key, a function for verifying the decoded authentication information, and a function for digitally signing the decrypted signature object data using the signature key based on the verification result, and wherein said terminal device comprises a means for inputting the authentication information, a means for encrypting the authentication information and the signature object data using the encryption key, a means for transmitting the crypto token including the encrypted authentication information and the encrypted signature object data to the edit server, and a means for requesting the edit server to generate the signature object data, and wherein said edit server comprises a means for saving electronic documents to be signed, a means for generating the signature object data from the electronic document to be signed in response to a generation request of the signature object data from the terminal device, and a means for transmitting the generated signature object data to the terminal device, and wherein said tamper resistant device generates the key pair of the public key and the secret key acting as the signature key in response to a key pair generation request or a signature key generation request from the terminal device, and the generated secret key is stored in the tamper resistant device in relation with the user's authentication information, and wherein when digitally signing, the edit server produces a signing request including the crypto token including the encrypted authentication information and the encrypted signature object data, and signature key identification information, and sends the generated signing request to the tamper resistant device, and wherein the tamper resistant device decodes the crypto token included in the received signing request using the decryption key, verifies the consistency between the decoded authentication information and the authentication information stored in relation with the signature key identified by the signature key identification information, and digitally signs the decoded signature target data based on the verification result.

As an example, the management of the electronic document can be performed by the edit server or by an electronic document management server. The electronic documents to be signed which are uploaded from the terminal devices are saved in the edit server. The edit server notifies a person who should sign said electronic document, that is, the signer, that the electronic document has been uploaded. The signer checks the electronic document to be signed and requests to generate the signature object data to the edit server, if there is no objection. The edit server generates the signature object data from the electronic document in response to the request from the terminal device and downloads it to the terminal device. The terminal device encrypts the downloaded signature object data along with the authentication information using the encryption key to generate the crypto token. The signing request including this crypto token is sent from the edit server to the tamper resistant device by way of the key management server.

The tamper resistant device decodes the crypto token, extracts the authentication information and the signature object data, and verifies the authentication information. Then, the tamper resistant device digitally signs the decoded signature object data based on the verification result. According to the invention, since the authentication information and the signature object data pass through the key management server in the encrypted state, there will be no accidents that the authentication information is abused or the signature object data is falsified.

The electronic signature system according to the invention in which the second measure is installed comprising a signing system which comprises one or more than one tamper resistant devices and a key management server having a function for controlling the tamper resistant device, an edit server having a function for managing an electronic document to be signed, and a certificate issuing server for generating a digital certificate used for digitally signing, and terminal devices through which users or signers operate, wherein said tamper resistant device comprises a function for generating a key pair of a public key and a secret key acting as a signature key, a function for storing the generated signature key in relation with authentication information indicating the use authority for the signature key, a function for decoding a crypto token including the encrypted authentication information and the encrypted signature object data using a decryption key, a function for verifying the decoded authentication information and the decoded signature object data, and a function for digitally signing on decrypted signature object data using the signature key based on the verification result, and wherein said terminal device comprises a means for inputting the authentication information, a means for encrypting the authentication information and the signature object data using the encryption key, a means for transmitting a crypto token including the encrypted authentication information and the encrypted signature object data to the edit server, and a means for requesting the generation of the signature object data to the edit server, and wherein said edit server comprises a means for saving the electronic document to be signed, a means for generating from the electronic document to be signed the two same signature object data one for verification and one for digital signing, and a means for transmitting the generated signature object data for verification to the terminal device, and wherein said tamper resistant device generates the key pair of the public key and the secret key acting as the signature key in response to a key pair generation request or a signature key generation request sent from the terminal device, and the generated secret key is stored in the tamper resistant device in relation with the user's authentication information, and wherein when digitally signing, the edit server produces a signing request which includes the signature key identification information, the signature object data for digital signing, and the crypto token including the encrypted signature object data for verification and the encrypted authentication information, and wherein the tamper resistant device decrypts the crypto token included in the received signing request using the decryption key, verifies the consistency between the decoded authentication information and the authentication information stored in relation with the signature key identified by the signature key identification information and the consistency between the signature object data for verification and the signature object data for digital signing, and digitally signs the signature target data for digital signing using the signature key based on the verification result.

The signing request transmitted to the tamper resistant device from the terminal device includes the authentication information, the signature object data and the signature key identification information for identifying the signature key. If such signing request would be extracted at the key management server, and the signing request that only the Hash value is falsified is transmitted to the tamper resistant device, the tamper resistant device decides that the entered authentication information is valid, and thus a problem that the tamper resistant device signs the falsified Hash value may be occurred. In order to solve this problem, according to the invention, the tamper resistant device verifies not only the user's use authority, but also verifies the signature object data. That is, the encrypted signature object data which is the criterion for the verification (signature object data for verification) and the signature object data subject to the digital signing (signature object data for the digital signing) are comparatively verified each other. If the signature object data is not falsified, the signature object data for verification and for digital signing are same each other. Now, the signature object data for verification cannot be falsified, because those are encrypted. Thus, if the signature object data for digitally signing is falsified, those data are different from those for verification. Therefore, by verifying the signature object data, it is judged whether the signature object data for signing is falsified or not. As the result of this, the electronic signature system having higher security level will be built.

The tamper resistant device according to the invention which is used in an electronic signature system of a remote signing type, wherein said tamper resistant device comprises a function for generating a key pair of a public key and a secret key acting as a signature key, a function for storing the generated signature key in relation with authentication information indicating the use authority for the signature key, a function for decoding a crypto token including the encrypted authentication information or a crypto token including the encrypted authentication information and encrypted signature object data using a decryption key, a function for verifying the decoded authentication information or verifying the decoded authentication information and the decoded signature object data, and a function for digitally signing using the generated signature key based on the verification result, and wherein said tamper resistant device generates the key pair of the public key and the secret key acting as the signature key in response to a reception of a key pair generation request or a signature key generation request from the terminal device, and the generated signature key is stored in relation with the user's authentication information, and wherein when digitally signing, a signing request including at least said crypto token and the signature key identification information which specifies the signature key is entered to said tamper resistant device, and wherein said tamper resistant device decrypts the received crypto token using the decryption key, and verifies the consistency between the decoded authentication information and the authentication information stored in relation with the signature key identified by the signature key identification information.

In a preferable embodiment of the tamper resistance according to the invention, said crypto token includes the encrypted authentication information and the encrypted signature object data, and wherein said tamper resistant device decrypts the encrypted authentication information and the encrypted signature object data included in the crypto token using the decryption key, and digitally signs the decoded signature object data based on the verification result for the authentication information.

In a preferable embodiment of the tamper resistance according to the invention, said signing request includes the crypto token including the encrypted authentication information and the encrypted signature object data, signature key identification information, and the signature object data for signing, and wherein said tamper resistant device decodes the crypto token, verifies the consistency of the authentication information and the consistency between the decoded signature object data and the signature object data for signing included in the signature request, and digitally signs the signature object data for signing based on the verification result.

In a preferable embodiment of the tamper resistance according to the invention, the secret key of said key pair or the secret key of a key pair set to said tamper resistant device for performing public key encryption communication is used as the decryption key, and the crypto token is encrypted by use of the public key of said key pair or the public key of the key pair set to the tamper resistant device for performing public key encryption communication as the encryption key. The decryption key is safely stored in the tamper resistant device. And so, even if the signing request including the encrypted authentication information is stolen by the system administrator, the signature key is never abused. Because, the authentication information cannot be decrypted. Therefore, by applying the tamper resistant device according to the invention to the electronic signature system of the remote type, the electronic signature system in which the abuse by the administrator is prevented can be built.

Advantageous Effect of Invention

According to the invention, since the authentication information indicating the use authority for the signature key is set to each signature key and the existence of the use authority is verified for each signing request, an electronic signature system in which only a user who has a legitimate use authority can digitally sign is built.

Furthermore, according to the invention, the authentication information and the signature object data are encrypted using the encryption method that a third party cannot decrypt, and the encrypted authentication information and the encrypted signature object data pass through the key management server. As a result of this, while utilizing the usefulness of the tamper resistant device, the problems caused by the tamper resistant device being controlled by the key management server, that is, the problem caused by the signature request going through the key management server is solved, the abuse of the signature key by the administrator is prevented, and the higher security level can be obtained.

When the authentication information and the signature object data are transmitted from the terminal device to the tamper resistant device, the public key encryption communication method is used. That is, the secret key of the key pair which is stored in the tamper resistant device is used as the decryption key, and the paired public key is used as the encryption key. By employing such a feature, the encryption method which cannot be decoded by the third party is built. As a result, even if the signing request for signature permission is sent to the tamper resistant device by way of the key management server, the terminal device and the tamper resistant device are maintained in a communication state equivalent to that directly interconnected.

Further, by verifying the signature object data in addition to the authentication information, the signing request in which the signature object data is falsified can be excluded from the digital signing.

BRIEF DESCRIPTION OF DRAWINGS

FIG. 1 is a view showing a whole structure of the electronic signature system according to the invention.

FIG. 2 is a view showing the algorithm of the signature key generation step of the electronic signature system according to the invention.

FIG. 3 is a view showing the algorithm of the signing step of the electronic signature system according to the invention.

FIG. 4 is a view showing a modified example of the signature key generation step.

FIG. 5 is a view showing a modified example of the signing step.

FIG. 6 is a view showing another modified example of the signing step.

FIG. 7 is a view showing one example of a terminal device.

FIG. 8 is a view showing one example of a key management server.

FIG. 9 is a view showing one example of a tamper resistant device.

FIG. 10 is a block diagram showing one example of an edit server.

FIG. 11 is a view showing a modified example of the electronic signature system according to the invention.

EMBODIMENTS OF INVENTION

According to the invention, the use authority for the signature key is also verified in addition to the user authentication. As the authentication information indicating the legitimate use authority for the signature key, an activation code signal (hereinafter referred to as "AC signal") is used, and an AC signal that only the signer knows is set to each signing key. That is, when generating the signature key, the user conceives the AC signal and inputs it into a terminal device. Such AC signal is a code information that only the user knows. The terminal device encrypts the inputted AC signal and transmits the encrypted AC signal to a tamper resistant device installed in the signing system. The tamper resistant device decodes the received encrypted AC signal and stores the decoded AC signal in relation to the corresponding signature key stored in the tamper resistant device.

When the signing request is entered by the user, let the user enter his/her AC signal. Then, the tamper resistant device verifies whether the valid AC signal is entered or not. And the tamper resistant device allows digital signing using the corresponding signature key only when the valid AC signal is entered. In this signature system, since only a person who knows the right AC signal can sign, an electronic signature system is built in which only the true owner of the signature key can digitally sign. Therefore, the abuse of the signature key can be prevented, even if the signature key is stolen.

However, in the case of the signing system in which the signature key is controlled by the AC signal, even if the signature key is protected robustly, when the AC signal is stolen by a system administrator, the administrator can activate the signature key by entering the stolen AC signal into the key management server. That is, if the signing request including the stolen signature key is sent to the tamper resistant device, since the included AC signal itself is normal, the tamper resistant device determines that the signing request is a signing request from a person who has a rightful use authority and performs the digital signing. Therefore, it is a critical problem to protect the AC signal from being illegally used. In order to solve this problem, the transmission step in which the AC signal is transmitted from the terminal device to the tamper resistant device and the processing step in which signal processing such as signing and verification is performed will be discussed.

Firstly, the processing step is considered. According to the invention, various processes including the digital signing or the like are performed using the tamper resistant device. The tamper resistant device can perform the signal processing including the generation of the signature key, digital signing, decryption and verification inside itself. And, the tamper resistant device is constructed so that the signature key and the inputted information are not leaked to the outside. Furthermore, even though attacked from the outside, the information saved within the tamper resistant device can be safely protected. Therefore, by using the tamper resistant device, the signature key and the AC signal are safely stored, and so there is no risk that the signature key and AC signal flow out and are passed into the system administrator.

Then, the transmission step will be discussed. The signer sends the AC signal to the tamper resistant device for each signing request. The AC signal sent from the terminal device to the tamper resistant device passes through the key management server which controls the tamper resistant device and is entered into the tamper resistant device. Namely, the tamper resistant device is a hardware and does not have any communication functions via the network. Therefore, the signal transmission/reception between the terminal device and the tamper resistant device is performed via the key management server. Namely, since the AC signal sent from the terminal device always passes through the key management server, there is a risk of the signing request including the AC signal being stolen or extracted at the key management server by a malicious administrator. In other words, even though the signature key is managed robustly using the tamper resistant device such as HSM, there is a risk that the AC signal is extracted while being transmitted from the terminal device to the tamper resistant device. In this way, although the tamper resistant device has excellent usefulness, there is a problem caused by transmitting through the key management server.

Thus, according to the invention, the AC signal entered by the user is properly encrypted to generate a crypto token, and the generated crypto token is transmitted to the tamper resistant device. According to the invention, as the transmission method of the AC signal, the public key cryptographic communication is used. As a key pair of a public key and a secret key in which the public key acts as an encryption key and the secret key acts as a decryption key, the key pair in which the secret key is always stored within the tamper resistant device is used. In this case, the crypto token can only be decrypted using the secret key stored within the tamper resistant device, and so even though the signing request including the AC signal is extracted at the key management server, the AC signal never be decoded. Therefore, the AC signal can be maintained as the same security level as the signature key.

As the public key which can be used to perform the public key cryptographic communication with the tamper resistant device, the public keys of the key pair which is set to the tamper resistant device and those of the key pair which is created to generate the signature key can be used. In the invention, both of the public keys can be used. However, if the encryption is performed using the public key set to the tamper resistant device, it is necessary to obtain the public key of the tamper resistant device in advance and load it into the program of the terminal device. And thus, the setting operation becomes more completed. That is, in the signature system in which multiple tamper resistant devices are used, it is necessary to obtain the public key of the tamper resistant device where user's signature key is stored in advance and load it into the program of the terminal device. However, this work is complicated and is a burden on the user.

On the contrary, the public key of the key pair generated in response to a key pair generation request is sent from the tamper resistant device to the terminal device together with a signature key generation notification. In this case, the complicated setting work is not required. Therefore, it is very useful technique to encrypt using the public key of the key pair generated when generating the signature key.

In this way, according to the invention, while taking advantage of the benefits of the tamper resistant device, the communication state between the terminal device and the tamper resistant device can be formed in such a manner that they are directly interconnected. As the result of this, while taking advantage of the benefits of the tamper resistant device, the drawback of the tamper resistant device is overcome and thus an electronic signature system with higher security level can be realized.

FIG. 1 is a diagram showing the whole structure of the electronic signature system according to the invention. To the network 1, there are connected terminal devices 2-1~2-n. These terminal devices are devices in which the user or signer operates, and are a personal computer or smartphone for example. In this regard, the concept of the user includes not only the signers digitally signing the electronic document but also those who upload the electronic document to the edit server or those who download the electronic document from the external server to the edit server. Therefore, the terminal device of the invention includes not only the terminal devices used by the signers but also those used for uploading the electronic document to the edit server.

To the network 1, a signing system 3 is connected. The signing system 3 comprises the key management server 4 and one or more tamper resistant devices 5 connected to the key management server. The key management server 4 is connected to the network and has the function for managing or controlling the tamper resistant device 5.

The tamper resistant device 5 has a function of safely generating and managing the signature key without leaking it to the outside and may be composed of Hardware Security Module (HSM), for example. The tamper resistant device includes a subsystem or a device having security managing function which is independent of the key management server. The tamper resistant device comprises a key management module which is a program for controlling the keys, and performs functions of generation of a key pair of a public key and a secret key acting as the signature key, digital signing using the signature key, storage of the signature key, decryption of the crypto token including the encrypted AC signal or the crypto token including the encrypted AC signal and the encrypted signature object data, and verifying of the decrypted AC signal and signature object data. Furthermore, the tamper resistant device comprises the key pair of the secret key and the public key which is set to the tamper resistant device in order to perform the public key encryption communication as necessary.

Furthermore, a certificate issuing server 6 provided in a certificate authority is connected to the network 1. The certificate issuing server 6 generates a certificate signing request (CSR) and creates an electronic certificate in response to a certification issuing request sent from the terminal device. Moreover, when generating the key pair that constitutes the signature key, a key pair generation request can be sent from the terminal device to the tamper resistant device by way of the certificate issuing server Furthermore, to the network 1, an edit server 7 is connected. The edit server 7 has a function for storing and managing the electronic documents to be signed, and stores the electronic documents to be signed which are uploaded from the terminal device or downloaded from the external server, etc. When the electronic document is uploaded, the edit server notifies the terminal device managed by the signer who should sign said electronic document. The edit server generates the signature object data (Hash value) from the electronic document in response to a signature object data generation request from the terminal device that received the notification. Furthermore, the edit server embeds the electronic signature generated by the signing system 3 into the edited electronic document to create a signed electronic document. The created signed electronic document is stored at the edit server 7.

Next, a generation algorithm of the signed electronic document will be explained. FIG. 2 is a flowchart showing the signature key generation step, and FIG. 3 is a flowchart showing the signing step. In this example, the public key and the secret key of the key pair generated to form the signature key are used as the encryption key and the decryption key, respectively.

Referring to FIG. 2, the user sends the authentication request to the key management server 4 of the signing system 3 through the terminal device 2. The authentication request can be a user authentication using a user ID and a password. If an account has not been created, the key management server 4 will create a new account for the user. Furthermore, as the user authentication, the authentication can also be performed by sending the token stored in the IC card to the key management server besides the method in which the combination of the user ID and the password is authenticated. After the user authentication, an authentication response is sent to the terminal device 2 from the key management server 4.

If the user authentication is successful, the user sends a key pair generation request from the terminal device to the key management server 4. The key management server 4 instructs the tamper resistant device 5 to generate the key pair. The tamper resistant device generates the key pair of the secret key and the public key in response to the reception of the key pair generation request. The generated secret key is to be the signature key and is used for the digital signature. And, the public key acts as the encryption key for encrypting the authentication information and also acts as a signature key identification information. Moreover, the secret key also acts the decryption key for decrypting the encrypted information. The tamper resistant device sends a key pair generation notification including the generated public key to the key management server, and the key management server sends it to the terminal device. The terminal device stores the received public key. In this example, since the public key of the generated key pair is used as the signature key identification information as well, the signature key and the decryption key are searched using the public key. Of course, as the identification information of the signature key, it is possible to set a unique identification information produced by the tamper resistant device. Moreover, the key pair generation request can be sent to the tamper resistant device by way of the certificate issuance server and the key management server.

Upon reception of the key pair generation notification, the user conceives the AC signal and enters the conceived AC signal into the terminal device through an input device such as a keyboard. As the AC signal, code information of 8-digits can be used. Alternatively, the user can set the authentication information composed of a simple code signal that is easy to remember, and the terminal device performs a combination operation using the set code signal, mail address and a terminal-specific constant to convert the simple code signal into a complicated code signal with a large number of digits, and the converted code signal with many digits can be used as the AC signal. For example, when SHA256 Hash operation is performed, since the user only remember the simple code information, the case of forgetting the authentication information is reduced, and also said code information is converted into a random code of 32 bytes (256 bit), and thus the security level of the AC signal is substantially enhanced.

The terminal device encrypts the AC signal inputted by the user using the public key of the key pair as the encryption key and generates the signature key registration request including the public key acting as the signature key ID. The terminal device sends the generated signature key registration request to the key management server. Here, the signature key registration request can be sent by way of the certificate issuing server.

The AC signal entered into the terminal device may be stored in the storage means of the terminal device. Furthermore, the inputted AC signal is encrypted using the encryption key and the encrypted AC signal (the encrypted authentication information) can be stored. Further, if the encrypted AC signal is stored, the stored encrypted AC signal can be included in the crypto token in the subsequent signature processing as it is.

The tamper resistant device searches the signature key using the signature key identification information. And, the tamper resistant device decodes the encrypted AC signal using the found secret key of the key pair (the signature key) as the decryption key. The decoded AC signal is stored in relation with the corresponding signature key. Thereby, the registration of the AC signal is completed. Then, the tamper resistant device sends an AC signal storage completion notification to the terminal device through the key management server. Furthermore, when the amount of the key pairs to be stored is too much and it overflows, it is possible to encrypt a part of the key pairs and store them in a database outside the tamper resistant device.

Subsequently, in order to get the digital certificate (a certificate for signing), the user sends the authentication request to the certificate issuing server 6 through the terminal device. This user authentication is the combination of the user ID and the password. The certificate issuing server sends an authentication response to the terminal device.

If the user authentication is successful, the terminal device sends an digital certificate issuance request including the user ID, the public key of the generated key pair and other necessary matters to the certificate issuing server. The certificate issuing server generates a certificate issuance request (CSR) using the received public key and necessary information, and produces the digital certificate after performing the prescribed examination processing. The produced digital certificate is sent to the terminal device. The terminal device stores the received digital certificate. Moreover, the digital certificate is sent to the edit server and is stored in the edit server as well if necessary.

FIG. 3 shows the signing step in which the digital signing is performed using the generated signature key. The user sends the user authentication request to the edit server 7 through the terminal device 2. The user authentication is performed using the combination of the user ID and the password. If the user authentication is successful, the edit server sends the authentication response to the terminal device. Subsequently, the user uploads a digital signature generation request including the electronic document to be signed to the edit server through the terminal device. The digital signature generation request includes the electronic document which is the signing target, the signer ID, an address of the user's terminal device, and the digital certificate.

The edit server edits the electronic document, such as setting the edit field. And, the edit server extracts the Hash value which is the signature object data by performing a predetermined logical operation on the signature target area of the electronic document. Subsequently, the edit server requests the terminal device to input the AC signal The user inputs the AC signal which is memorized by him/her into the terminal device. The terminal device encrypts the inputted AC signal using the encryption key (public key) to generate the crypto token including the encrypted AC signal. Then, the terminal device sends the signature information including the crypto token and the public key acting as the signature key ID to the edit server. The edit server forms the signing request including the received crypto token, the signature object data and the signature key identification information, and sends it to the tamper resistant device through the key management server.

The tamper resistant device searches the corresponding signature key using the signature key identification information. Subsequently, the tamper resistant device decodes the AC signal included in the received crypto token using the signature key as the decryption key. Then, the tamper resistant device performs comparative verification between the decoded AC signal and the searched AC signal which is stored in relation with the searched signature key. As verification result, if the decoded AC signal match the stored AC signal, the digital signature is generated by digitally signing the received signature object data. The signing result including the digital signature and the signature key identification information is sent to the edit server via the key management server. However, the AC signal does not match, this request is processed as an error.

The edit server generates a signed electronic document (a signed document) by embedding the received digital signature into the edited electronic document. The digital signature is added with a signature time stamp generated by a time stamp server, and the time stamped digital signature can be embedded into the electronic document as a long term signature to guarantee the long-term efficiency of the digital signature. The signed electronic document is stored in the edit server and is sent to the terminal device, if necessary. In the present example, the public key correlating with the secret key (signature key) stored in the tamper resistant device is transmitted to the terminal device from the tamper resistant device, and thus the setting task of the encryption key used in the public key cryptographic communication becomes unnecessary and the workability is substantially improved.

Next, an example in which the public key and secret key of the key pair which is set to the tamper resistant device to perform the public key encrypt communication are used as the encryption key and the decryption key will be explained. FIG. 4 shows the algorithm to explain the signature key generation process in which the AC signal is encrypted using the public key for public key cryptography communication set in the tamper-resistant device.

The user sends the authentication request to the key management server through the terminal device. The authentication request is the user authentication using the user ID and the password. If the user authentication is successful, the user sends the signature key generation request to the key management server from the terminal device. The key management server sends an AC signal input request to the terminal device as a reply.

The user conceives his/her AC signal and enters the conceived AC signal into the terminal device through the input device. The inputted AC signal is encrypted using the public key of the key pair set to the tamper resistant device to generate the crypto token. For that reason, the user gets the public key of the tamper resistant device in advance and lets it be read by the program. The terminal device generates the signature key generation request including the user ID and the crypto token and sends it to the tamper resistant device via the key management server.

The tamper resistant device generates the key pair of the public key and secret key in response to the reception of the signature key generation request. The generated secret key becomes a signature key and is used for the digital signing. Further, the tamper resistant device decrypts the received crypto token using the own secret key as the decryption key. Then, the generated key pair and the decoded AC signal is stored as a pair.

Then, the tamper resistant device sends a signature key registration completion notification including the generated public key to the corresponding terminal device.

Upon reception of the signature key registration completion notification, the terminal device saves the received public key.

Subsequently, the user accesses the certificate issuing server via the terminal device and obtains the digital certificate based on the above mentioned process. The obtained digital certificate is stored in the terminal device.

In the signing step, the digital signature is formed according to the algorithm shown in FIG. 3 to create the signed electronic document. Moreover in the signing step, the AC signal to be sent from the terminal device to the tamper resistant device is encrypted using the public key of the public key encryption communication set to the tamper resistant device. And, the tamper resistant device decodes the received AC signal using its own secret key as the decryption key.

Next, a variation of the signing step will be explained. In the above mentioned embodiment, the AC signal is verified, and the digital signing is performed if the AC signal included in the signing request match the AC signal stored in relation with the signature key. However, in the system in which only the AC signal is verified, if the signing request is stolen or extracted at the edit server or the key management sever, there is raised a risk that the signature object data may be falsified and the falsified signature object data may be signed. That is, the signing request includes the crypto token, the signature object data and the signature key ID. On the other hand, since the tamper resistant device verifies only the AC signal, if the AC signal is normal, the digitally signing will be made even though the Hash value is falsified. Therefore, if the signing request is stolen by the system administrator and the signing request including the falsified Hash value is produced and sent to the tamper resistant device, the problem may occur that the tamper resistant device may judge that the signing request including the falsified Hash value is valid and digitally sign the falsified Hash value. In other words, there is a risk that the digital signing is abused.

In order to solve the above-mentioned problem, according to the present example, both of the AC signal and the signature object data are verified. And, the digital signing is performed only when both of the AC signal and the Hash value are valid.

FIG. 5 illustrates the algorithm in which both of the AC signal and the signature object data are verified. In this example, the edit server has a function as a management server for managing the uploaded electronic document. The electronic documents to be signed are uploaded to the edit server 7 from the terminal devices, and the uploaded information is entered into the edit server. And, the electronic documents to be signed are entered from the external server as well. The upload information includes the electronic document to be signed, the identification information of the signer, and the address information of the signer's terminal device. The uploaded electronic document is saved and managed by the edit server.

When the upload information is entered into the edit server, it stores the uploaded electronic document and notifies that the signature is requested to the terminal device of the user who should sign. The user who receives the notification requests the user authentication to the edit server 7 through the terminal device. If the user authentication is normal, the edit server sends the authentication response to the terminal device.

The user checks the electronic document which is the signing object. When signing the checked electronic document, the user requests the generation of the signature object data to the edit server through user's own terminal device. This generation request of the signature object data sent from the terminal device to the edit server has a meaning as the user's indication of intention to request the signature processing. And, this generation request acts as a trigger, and a sequence of the signature processing starts automatically.

The edit server edits the electronic document in response to the reception of the generation request of the signature object data from the terminal device and also generates from the electronic document two identical signature object data, one for verification and the other for signing. The signature object data for verification is the verification criteria. The signature object data for signing are those that are actually signed. Subsequently, the edit server downloads the signature object data for verification to the terminal device.

The user enters the AC signal (authentication information) into the terminal device via the keyboard in response to the downloading of the signature object data. The terminal device encrypts both of the inputted AC signal and the downloaded signature object data for verification to generate the crypto token. However, when the AC signal is stored in the terminal device, the stored AC signal and the signature object data are encrypted. Otherwise, if the encrypted AC signal is stored in the terminal device, only the downloaded signature object data is encrypted, and the crypto token is generated using the encrypted signature object data and the stored and encrypted AC signal.

The terminal device transmits the signature information including the generated crypto token and the signature key identification information to the edit server. However, if the signature key identification information is stored in the edit server and the edit server can add the signature key identification information to the signature request, the signature information including only the crypto token is transmitted to the edit server. Here, since the signature object data is encrypted, it cannot be tampered. Of course, the AC signal is also encrypted, and thus it cannot be tampered.

The edit server generates the signature request including the crypto token, the signature key identification information and the signature object data for signing. The generated signature request is sent to the tamper resistant device. If the system operates normally, the signature object data for signing included in the signature request is identical to those included in the crypto token. On the contrary, if the signature request is stolen and the signature object data is falsified, the signature object data for signing is different from those included in the crypto token.

The tamper resistant device searches the decryption key (the secret key of the key pair, that is, the signature key corresponds) using the signature key identification information and decodes the crypto token included in the signature request using the decryption key. Then, the tamper resistant device verifies the consistency between the decoded AC signal and those stored in relation with the signature key. Furthermore, the consistency between the signature object data for signing and the decoded signature object data for verification is also verified. By verifying the AC signal, it is judged whether or not the signature request is performed by a person having the legitimate use authority. And also, by verifying the signature object data, it is judged whether or not the signature object data is falsified. As the verification result, if both of the AC signal and the signature object data match, said signing request is judged to be valid, and the signature object data for signing is digitally signed. The signature result including the generated electronic signature is sent to the edit server via the key management server. Whereas, the AC signal or the signature object data mismatches, the signing request is handled as an error.

In this example, if the signing request is stolen and the signature object data are falsified, this signing request is determined to be invalid, because the signature object data are different. Thus, even though the signing request is stolen, the problem of signing the wrong electronic document does not occur. In this way, by verifying both of the signature requester and the signature object, a higher security level can be achieved.

The edit server embeds the received electronic signature into the electronic document to generate the signed electronic document (a signed document). The signed electronic document is stored in the edit server and is transmitted to the terminal device, if necessary.

Another variation of the signing step will be explained. FIG. 6 shows the algorithm in which the AC signal and the signature object data are encrypted to produce the crypto token and the verification is performed only on the AC signal. Since the process from the user authentication to the crypto token generation step is the same as those of the embodiment shown in FIG. 5, the description thereof will be omitted.

The terminal device encrypts both of the inputted authentication information and the downloaded signature object data to generate the crypto token. The terminal device transmits the signature information including the produced crypto token and the signature key identification information to the edit server. The edit server generates the signature request including the crypto token and the signature key identification information. The generated signature request is transmitted to the tamper resistant device by way of the key management server.

The tamper resistant device decrypts the crypto token included in the signature request using the decryption key to decode the AC signal and the signature object data, respectively. Subsequently, the consistency between the decoded authentication information and those stored in relation with the signature key. As the verification result, when the AC signals match, the signing request is determined to be valid and the digital signing is performed on the decoded signature object data to produce the electronic signature. The signing result including the generated electronic signature is transmitted to the edit server by way of the key management server.

In the present embodiment, since the AC signal and the signature object data are encrypted at the terminal device and are transmitted to the tamper resistant device by way of the key management server, even if the signature request is stolen, the problem that the falsified electronic document is digitally signed will never occur. Furthermore, in the present embodiment, since the verification is performed only on the authentication information and the verification on the signature object data is unnecessary, the advantage that the processing steps are simplified while keeping high security level is achieved.

FIG. 7 is a block diagram showing the functional configuration of the terminal device. FIG. 7 shows only the part relating to the electronic signature. The terminal device comprises a communication means 10, a control section 11, an input device 12, and a storage section 13. The communication means 10 is connected to the network and performs the transmission/reception of the data among the key management server and so on. The control section 11 has an authentication request section 14 to transmit the authentication request including the user ID and the password to the key management server and so on. Subsequently, after logging in to the signing system, a key pair generation request is transmitted to the tamper resistant device from a key pair generation request section 15. The public key of the key pair generated by the tamper resistant device is stored in a public key storage section 16 of the storage section through the transmission means.

The user enters the AC signal to the terminal device through the input device 12 such as a keyboard. The inputted AC signal is supplied to an encryption section 17 of the control section and is encrypted using the public key (encryption key) stored in the public key storage section, and is sent to a signature key registration request generation section 18. The signature key registration request generation section 18 generates the signature key registration request including the encrypted AC signal and sends it to the tamper resistant device via the communication means.

An electronic certificate issuance request section 19 generates an electronic certificate issuance request including the public key sent from the tamper resistant device and transmits it to the certificate issuing server. The generated electronic certificate is sent to the terminal device and is stored in a digital certificate storage section 20.

An electronic document upload section 21 generates an electronic signature generation request including the electronic document stored in an electronic document storage section 22 and the stored digital certificate, and transmits it to the edit server. Further, regarding to the electronic document that requires the signature of another person, it is added with the signer's ID and address and is uploaded to the edit server.

When the signed electronic document is formed by the edit server, the generated signature document is stored in an electronic document storage section 23 of the storage section.

FIG. 8 illustrates the functional configuration of the key management server. The key management server comprises a communication means 30, a control section 31, and a user information database 32. The control section includes a user authentication processing section 33 to process the authentication request from the terminal device.

The key pair generation request and the signature key registration request sent from the terminal device and the signing request sent from the edit server are supplied to a tamper resistant device control section 34, and instructions corresponding to the designated processing are sent to the tamper resistant device. The various information such as the electronic signature generated by the tamper resistant device is transmitted to the terminal device or the edit server via the tamper resistant device control section. Furthermore, the key management server and the tamper resistant device are connected via an internal or external bus. Alternatively, they can be connected via LAN.

FIG. 9 illustrates the functional configuration of the tamper resistant device. The tamper resistant device comprises a management section 40, a processing section 41 and a memory section 42. The information signals transmitted from the terminal device or the edit server are entered into the management section 40 by way of the key management server. The management section 40 controls each function section provided in the processing section and performs the designated function based on the inputted information signal. The key pair generation section 43 generates the key pair of the secret key acting as the signature key and the public key in response to the reception of the key pair generation request. The generated key pair is stored in a storage section 44, and the public key is sent to the terminal device via the management section.

In response to the reception of the signature key registration request, the AC signal is extracted and is decrypted using the secret key at a decryption section 45. The decrypted AC signal is sent to the storage section 44. The storage section forms key pair data having the generated key pair and the AC signal as a pair. This key pair data is stored in a key pair data memory section 46 provided in the memory section 42.

When the signing request is inputted, the decryption section 45 operates to search the corresponding secret key (the signature key) using the signature key identification information and to decrypt the encrypted AC signal included in the signing request using the searched secret key as the decryption key. Then, the decrypted AC signal and the AC signal being stored together with the searched signature key are sent to a verification section 47 and the comparative verification is performed. If these AC signals are match each other, the digital signature is allowed. Then, at a digital signing section 48, the signature object data included in the signing request is digitally signed using the corresponding signature key.

FIG. 10 is a block diagram showing the functional configuration of the edit server. The edit server comprises a communication means 50, a control section 51 and a storage section 52. The communication means 50 is connected to the network to transmit and receive the information to and from the terminal device, the key management server and the tamper resistant device. A user authentication processing section 53 processes the authentication request sent from the terminal device using the user information stored in a user information storage section 54.

The upload information uploaded from the terminal devices is entered into a upload information reception section 55. The upload information is sent to signature notification section 56, and a signature notification indicating that a signature is requested is transmitted to the terminal device at the signer's address included in the upload information. Moreover, the electronic document included in the upload information is stored in an electronic document storage section 57.

The download request of the signature object data from the signer is inputted to a download request reception section 58. In response to the inputted download request, a signature object data generation section 59 acts to generate two same signature object data of those for signing and those for verification. The generated signature object data for verification is sent to the terminal device managed by the corresponding signer from a signature object data downloading section 60.

The signature information sent from the signer's terminal device is entered into a signature request generation section 61. The signature request generation section generates the signature request by adding the signature object data for signing to the encrypted information and the signature key identification information included in the signature information. The generated signature request is sent to the tamper resistant device.

The edit server comprises an editing section 62. The editing section edits the electronic document to be signed to set the arranging method or arranging location of the field of the electronic signature which is to be formed.

The electronic signature which is the signing result generated by the tamper resistant device is inputted into a signed electronic document generation section 63. The edition information generated by the editing section is also inputted into the signed electronic document generation section, and the electronic signature is embedded onto the stored electronic document to generate the signed electronic document (signature document). The generated signed electronic document is stored in the signature document storage section 64.

FIG. 11 is a diagram illustrating the variation of the electronic signature system according to the invention. In this example, VPN connections 70 and 71 are provided between the key management server 4 and the certificate issuing server 6 and between the key management server 4 and the edit server 7, respectively. By providing the VPN connections, the key management server 4 and the certificate issuing server 6 are equivalent to being directly interconnected and the key management server 4 and the edit server 7 are also equivalent to being directly interconnected. Thereby, safe encrypted transmission lines are built between the certificate issuing server and the key management server and between the edit server and the key management server.

Furthermore, the certificate issuing server 6 and the edit server 7 are constructed by an authentication server with personal authentication function. The user (the terminal device) has an account on the authentication servers (the certificate issuing server 6 and the edit server 7), respectively, and exchanges messages with the authentication servers by SSL encrypted communication through the login authentication process. As a result, the transmission lines between the terminal device 2 and the certificate issuing server 6 and between the terminal device 2 and the edit server 7 are protected by SSL encrypted communication.

In the signature key generation step, the public key of the key pair generated by the tamper resistant device is sent to the terminal device by way of the key management server 4, the VPN connection 70 and the certificate issuance server 6. And, the crypto token generated by the terminal device is sent to the tamper resistant device by way of the certificate issuance server 6, the VPN connection 70 and the key management server 4.

Furthermore, in the signing step, the crypto token generated by the terminal device is sent to the tamper resistant device by way of the edit server 7, the VPN connection 71 and the key management server. The electronic signature generated by the tamper resistant device is sent to the edit server 7 by way of the key management server and the VPN connection 71. As the result of this, a safe transmission line is built between the terminal device giving the signature instruction to the tamper resistant device and the tamper resistant device for digitally signing based on the instruction from the terminal device.

The certificate issuing server and the edit server have a robust system configuration that is resistant to hacking. Therefore, the key management server and the tamper resistant device are constructed to be protected by two robust system configurations. As a result, the key management server and the tamper resistant device are less susceptible to attack by attackers, and thus the protection function against the signature key and the authentication information is significantly improved. Especially, if the key management server is hacked and hijacked by a hacker, a serious accident may occur. On the contrary, as in the present invention, by configuring that the key management server is connected to the network by way of two servers of the certificate issuing server and the edit server, the key management server is strongly protected, and thus the usefulness effect can be obtained in dealing with hacking.

The present invention is not limited to the above-mentioned embodiments and can be modified and changed in various ways. For example, in the above mentioned example, the electronic signature system including the signing system, the edit server, the certificate issuance server and the terminal devices was explained. But, an independent electronic document management server having a function for managing the electronic documents can be used in the invention. That is, the electronic documents uploaded from the terminal devices can be entered into the electronic document management server and can be managed thereby. Then, the electronic document management server transfers the uploaded information to the edit server, and the edit server can perform various processing including the generation of the signature object data and the generation of the signature request and so on.

In the signing step, the validity of the signing request can be verified by use of challenge code. That is, when verifying the signing request, the terminal device requests the challenge code to the tamper resistant device. The generated challenge code is sent to the terminal device. The challenge code is encrypted together with the AC signal and is transmitted to the tamper resistant device. The tamper resistant device decrypts the received challenge code and the AC signal to perform the comparative verification between the decrypted challenge code and the stored challenge code. In this way, by verifying the challenge code as well, the validity of the signing request itself can be judged.

As the inputting method of the authentication information at the terminal device, data generated by a predetermined logic operation on the basis of the information entered by the user can be the authentication information. Moreover, the inputted authentication information is stored in the terminal device, and the stored authentication information can be used to generate the crypto token. Furthermore, the tamper resistant device may have a function to register biometric data such as a user's fingerprint and a function to authenticate the biometric data, and only when the result of the biometric authentication is valid, the authentication information stored in the terminal device can be extracted and be encrypted. In this case, the biological data function as the authentication information.

With respect to the encryption and decryption of the authentication information, the authentication information is encrypted using common key cryptosystem, and the common key used for the encryption is encrypted using the public key of the key pair and is sent to the tamper resistant device. Then, the tamper resistant device can decrypt the encrypted common key using the secret key of the key pair and decrypt the authentication information by use of the decrypted common key.

In terms of the signature object data, such signature object data mean the data which is extracted by performing a predetermined operation (Hash operation) on the signature target area of electronic document.

INDUSTRIAL APPLICATION

The present invention is applicable in the electronic signature system of the remote signing type in which the signature key is stored on the business operator's server.

What is claimed is:

1. An electronic signature system of a remote signing type comprising:
   a signing system which includes one or more than one tamper resistant devices each comprising one or more processors configured to generate and manage signature keys and a key management server comprising one or mere processors configured to control the one or more than one tamper resistant devices; and
   terminal devices through which users or signers operate, wherein
   said one or more than one tamper resistant devices are configured to generate a key pair of a public key and a secret key acting as the signature key, store the generated signature key together with authentication information indicating a use authority for the signature key, decrypt a crypto token including an encrypted authentication information or a crypto token including the encrypted authentication information and an encrypted signature object data using a decryption key, verify the decrypted authentication information or verify the decrypted authentication information and the decrypted signature object data, and digitally sign the signature object data using the signature key based on the verification result, and wherein
   said terminal device comprises a means for inputting the authentication information, and an encryption software for encrypting the authentication information or the authentication information and the signature object data using an encryption key to generate the crypto token, and wherein
   said one or more than one tamper resistant devices generate the key pair of the public key and the secret key in response to a key pair generation request sent from the terminal device, the secret key of the generated key pair is stored in the one or more than one tamper resistant devices in relation with the user's authentication information, and the public key of the key pair is transmitted to the terminal device and is stored therein, and wherein the public key of the key pair stored in the terminal device functions as the encryption key for encrypting the authentication information or the authentication information and the signature object data, and the secret key stored in the one or more than one tamper resistant devices functions as the decryption key for decrypting the crypto token, and wherein upon digitally signing, the terminal device encrypts the authentication information or the authentication information and signature object data to generate the crypto token, and wherein a signing request which includes at least the crypto token and signature key identification information which specifies the signature key is entered into the one or more than one tamper resistant devices, and wherein said one or more than one tamper resistant devices decrypt the crypto token included in the signing request using the decryption key, verify the matching between the decrypted authentication information and the authentication information stored in relation with the signature key identified by the signature key identification information, and digitally sign the signature object data.

2. The electronic signature system of claim 1, wherein said crypto token included in the signing request comprises the encrypted authentication information and the encrypted signature object data, and wherein said one or more than one tamper resistant devices decrypt the encrypted authentication information and the encrypted signature object data, and digitally sign on the decrypted signature object data based on the verification result of the authentication information.

3. The electronic signature system of claim 1, wherein said signing request comprises the crypto token including the encrypted authentication information and the encrypted signature object data, the signature key identification information, and the signature object data to be signed, and wherein said one or more than one tamper resistant devices decrypt the crypto token, verify the matching of the authentication information and the matching between the signature object data to be signed and the decrypted signature object data, and digitally sign the signature object data to be signed based on the verification results.

4. The electronic signature system of claim 1, wherein said one or more than one tamper resistant devices comprise a key pair of a secret key and a public key set up in order to perform public key cryptography, the encryption software of the terminal device encrypts using the public key of said key pair set in the one or more than one tamper resistant devices as the encryption key, and said one or more than one tamper resistant devices decrypt using the secret key of said key pair as the decryption key.

5. The electronic signature system of claim 1, wherein said public key of the key pair generated by the one or more than one tamper resistant devices is used as the identification information for identifying the signature key, which is composed of the secret key which is paired with said public key, and the signing request sent to the one or more than one tamper resistant devices includes the public key of the key pair as the signature key identification information.

6. The electronic signature system of claim 1, wherein said electronic signature system further comprises an edit server comprising one or more processors configured to manage electronic documents to be signed and a certificate issuing server comprising one or more processors configured to generate a digital certificate for signing.

7. An electronic signature system of a remote signing type comprising:

a signing system which includes one or more than one tamper resistant devices each comprising one or more processors configured to generate and manage signature keys and a key management server comprising one or more processors configured to control the one or more than one tamper resistant devices;

an edit server comprising one or more processors configured to manage electronic documents to be signed;

a certificate issuing server comprising one or more processors configured to generate a digital certificate for signing; and terminal devices through which users or signers operate, wherein said one or more than one tamper resistant devices are configured to generate a key pair of a public key and a secret key acting as the signature key, store the generated signature key in relation with authentication information indicating a use authority for the signature key, decrypt a crypto token including the an encrypted authentication information using a decryption key, verify the decrypted authentication information, and digitally sign signature object data using the signature key based on the verification result, and wherein said terminal device comprises a means for inputting the authentication information, an encryption software for encrypting the inputted authentication information using an encryption key to form the crypto token, and a means for transmitting the generated crypto token to the edit server, and wherein said edit server is configured to generate the signature object data from the electronic document to be signed, and wherein said one or more than one tamper resistant devices generate the key pair of the public key and the secret key acting as the signature key in response to a key pair generation request from the terminal device, and the generated secret key is stored in the one or more than one tamper resistant devices in relation with the user's authentication information and the public key of the key pair is transmitted to the terminal device and is stored therein, and wherein the public key of the key pair stored in the terminal device functions as the encryption key for encrypting the authentication information or the authentication information and the signature object data, and the secret key stored in the one or more than one tamper resistant devices functions as the decryption key for decrypting the crypto token, and wherein when digitally signing, the edit server produces a signing request including the crypto token including the encrypted authentication information, signature key identification information and the signature object data, and sends the signing request to the tamper resistant devices, and wherein the one or more than one tamper resistant devices decrypt the authentication information included in the received crypto token using the decryption key, verify the matching between the decrypted authentication information and the authentication information stored in relation with the signature key identified by the signature key identification information, and digitally sign the signature object data on the basis of the verification result.

8. The electronic signature system of claim 7, wherein said terminal device comprises a means for uploading the electronic document to be signed to the edit server, and the edit server comprises an electronic document storage means for storing the electronic document uploaded from the terminal device.

9. The electronic signature system of claim 7, wherein said edit server comprises a software for editing the electronic document to be signed and embedding the electronic signature generated by the one or more than one tamper resistant devices into the edited electronic document to form a signed electronic document.

10. The electronic signature system of claim 7, wherein said certificate issuing server generates the electronic certificate used for digital signing by use of the public key paired with the secret key acting as the signature key.

11. The electronic signature system of claim 7, wherein the key management server and the certificate issuing server are interconnected via a VPN connection, and the key management server and the edit server are interconnected via a VPN connection.

12. The electronic signature system of claim 7, wherein the certificate issuing server and/or the edit server are configured by an authentication server having an authentication function, and wherein
the terminal device exchanges a message with the authentication server by SSL encryption communication via a login authentication process.

13. An electronic signature system of a remote signing type comprising:
a signing system which includes one or more than one tamper resistant devices each comprising one or more processors configured to generate and manage a signature key and a key management server comprising one or more processors configured to control the one or more than one tamper resistant devices;
an edit server comprising one or more processors configured to manage electronic documents to be signed;
a certificate issuing server comprising one or more processors configured to generate a digital certificate used for digital signing; and
terminal devices through which users or signers operate, wherein
said one or more than one tamper resistant devices are configured to generate a key pair of a public key and a secret key acting as a signature key, store the generated signature key in relation with authentication information indicating a use authority for the signature key, decrypt a crypto token including an encrypted authentication information and an encrypted signature object data using a decryption key, verify the decrypted authentication information, and digitally sign the signature object data using the signature key on the basis of the verification result, and wherein
said terminal device comprises a means for inputting the authentication information, an encryption software for encrypting the authentication information and the signature object data to form the crypto token using an encryption key, and a means for transmitting the generated crypto token to the edit server, and means for requesting the generation of the signature object data to the edit server, and wherein
said edit server comprising one or more processors configured to generate the signature object data from the electronic document to be signed, and transmit the signature object data to the terminal device, and wherein
said one or more than one tamper resistant devices generate the key pair of the public key and the secret key acting as the signature key in response to a key pair generation request from the terminal device, and the secret key of the generated key pair is stored in the one or more than one tamper resistant devices in relation with the user's authentication information and the public key of the key pair is transmitted to the terminal device and is stored in the terminal device, and wherein
the public key of the key pair stored in the terminal device functions as the encryption key for encrypting the authentication information or the authentication information and the signature object data, and the secret key stored in the one or more than one tamper resistant devices functions as the decryption key for decrypting the crypto token, and wherein
when digitally signing, the edit server produces a signing request including the crypto token which includes the encrypted authentication information and the encrypted signature object data, and signature key identification information, and sends the generated signing request to the one or more than one tamper resistant devices, and wherein
the one or more than one tamper resistant devices decrypt the authentication information and the signature object data included in the received crypto token using the decryption key, verify the matching between the decrypted authentication information and the authentication information stored in relation with the signature key identified by the signature key identification information, and digitally sign a decrypted signature object data using the signature key on the basis of the verification result.

14. An electronic signature system of a remote signing type comprising
a signing system which comprises one or more than one tamper resistant devices each comprising one or more processors configured to generate and manage a signature key and a key management server comprising one or more processors configured to control the one or more than one tamper resistant devices;
an edit server comprising one or more processors configured to manage electronic documents to be signed;
a certificate issuing server comprising one or more processors for generating a digital certificate used for digital signing; and
terminal devices through which users or signers operate, wherein
said one or more than one tamper resistant devices are configured to generate a key pair of a public key and a secret key acting as a signature key, store the generated signature key in relation with authentication information indicating a use authority for the signature key, decrypt a crypto token including an encrypted authentication information and an encrypted signature object data using a decryption key, verify the decrypted authentication information and the decrypted signature object data, and digitally sign the signature object data using the signature key based on the verification result, and wherein
said terminal device comprises a means for inputting the authentication information, an encryption software for encrypting the authentication information and the signature object data to form the crypto token using an encryption key, a means for transmitting the generated crypto token to the edit server, and a means for requesting the generation of the signature object data to the edit server, and wherein said edit server is configured to generate from the electronic document to be signed the two identical signature object data for verification and for digital signing, and transmit the generated signature object data for verification to the terminal device, and wherein said one or more than one tamper resistant devices generate the key pair of the public key and the secret key acting as the signature key in response to a key pair generation request from the terminal device, and the secret key of the generated key pair is stored in the one or more than one tamper resistant devices in relation with the user's authentication information and the public key of the key pair is transmitted to the terminal device and is stored in this terminal device, and wherein the public key of the key pair functions as the encryption key for encrypting the authentication information or the authentication information and the signature object data, and the secret key stored in the one or more than one tamper resistant devices functions as the decryption key for decrypting the crypto token, and wherein when digitally signing, the edit server produces a signing request which includes the signature key identification information, the signature object data for digital signing, and the crypto token including the encrypted signature object data for verification and the encrypted authentication information, and wherein the one or more than one tamper resistant devices decrypt the crypto token included in the received signing request using the decryption key, verify the matching between the decrypted authentication information and the authentication information stored in relation with the signature key identified by the signature key identification information and the matching between a decrypted signature object data for verification and those for digital signing, and digitally sign the signature object data for digital signing using the signature key based on the verification result.

15. A tamper resistant device which is used in an electronic signature system of a remote signing type, wherein said tamper resistant device comprising one or more processors configured to generate a key pair of a public key and a secret key acting as a signature key, store the generated signature key in relation with authentication information indicating a use authority for the signature key, decrypt a crypto token including an encrypted authentication information or a crypto token including the encrypted authentication information and an encrypted signature object data using a decryption key, verify the decrypted authentication information or verify the decrypted authentication information and a decrypted signature object data, and digitally sign the signature object data using the signature key based on the verification result, and wherein said tamper resistant device generates the key pair of the public key and the secret key acting as the signature key in response to a reception of a key pair generation request from a terminal device, and the generated signature key is stored in the tamper resistant device in relation with the user's authentication information, and the generated public key is transmitted to the terminal device and is stored therein, and wherein the public key of the key pair is used as an encryption key for encrypting the authentication information or the authentication information and signature object data, and the secret key of the key pair is used as the decryption key for decrypting the authentication information or the authentication information and the signature object data encrypted using the public key, and wherein when digitally signing, a signing request including at least said crypto token and signature key identification information which specifies the signature key is entered into said tamper resistant device, and wherein said tamper resistant device decrypts the received crypto token using the decryption key, and verifies the matching between the decrypted authentication information and the authentication information stored in relation with the signature key identified by the signature key identification information, and digitally signs the signature object data based on the verification result.

16. The tamper resistant device of claim 15, wherein said crypto token includes the encrypted authentication information and the encrypted signature object data, and wherein said tamper resistant device decrypts the encrypted authentication information and the encrypted signature object data included in the crypto token by use of the decryption key, and digitally signs the decrypted signature object data based on the verification result about the authentication information.

17. The tamper resistant device of claim 15, wherein said signing request includes the crypto token including the encrypted authentication information and the encrypted signature object data, the signature object data for signing, and the signature identification information, and wherein said tamper resistant device decrypts the crypto token, verifies the matching of the authentication information and the matching between the decrypted signature object data and the signature object data for signing included in the signature request, and digitally signs the signature object data based on the verification results.

18. The tamper resistance of claim 15, wherein the secret key of said key pair or a secret key of a key pair set to said tamper resistant device to perform public key cryptography is used as the decryption key, said crypto token is encrypted using the public key of said key pair or a public key of the key pair set to the tamper resistant device in order to perform public key cryptography as the encryption key.

19. The tamper resistance of claim 15, wherein the public key of the key pair is used as the signature key identification information.

20. The tamper resistance of claim 15, wherein said tamper resistant device is configured by a Hardware Security Module (HSM).

* * * * *